United States Patent
Yoneyama et al.

(10) Patent No.: US 10,809,352 B2
(45) Date of Patent: Oct. 20, 2020

(54) SIGNAL PROCESSING DEVICE AND METHOD, AND INFORMATION PROCESSING DEVICE AND METHOD

(71) Applicant: SONY SEMICONDUCTOR SOLUTIONS CORPORATION, Kanagawa (JP)

(72) Inventors: Yusuke Yoneyama, Tokyo (JP); Seiji Kobayashi, Kanagawa (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 0 days.

(21) Appl. No.: 15/576,529

(22) PCT Filed: May 25, 2016

(86) PCT No.: PCT/JP2016/065389
§ 371 (c)(1),
(2) Date: Nov. 22, 2017

(87) PCT Pub. No.: WO2016/194720
PCT Pub. Date: Dec. 8, 2016

(65) Prior Publication Data
US 2018/0149728 A1 May 31, 2018

(30) Foreign Application Priority Data
Jun. 5, 2015 (JP) .................. 2015-114914

(51) Int. Cl.
*G01S 5/14* (2006.01)
*H04W 64/00* (2009.01)
*G01S 11/08* (2006.01)

(52) U.S. Cl.
CPC .............. *G01S 5/14* (2013.01); *G01S 11/08* (2013.01); *H04W 64/00* (2013.01)

(58) Field of Classification Search
CPC ........ H04W 4/028; H04W 4/029; H04W 4/04
See application file for complete search history.

(56) References Cited

U.S. PATENT DOCUMENTS 5,329,946 A   7/1994  Guma
5,920,278 A   7/1999  Tyler et al.
(Continued)

FOREIGN PATENT DOCUMENTS

JP   2001-349935 A   12/2001
JP   2004-356755 A   12/2004
(Continued)

OTHER PUBLICATIONS

International Search Report and Written Opinion of PCT Application No. PCT/JP2016/065389, dated Aug. 9, 2016, 15 pages of ISRWO.

*Primary Examiner* — Wen W Huang
(74) *Attorney, Agent, or Firm* — Chip Law Group

(57) ABSTRACT

The disclosure relates to a signal processing device and method, and an information processing device and method, in which a distance between a position where a signal is transmitted and a position where the signal is received can be obtained with higher accuracy. A predetermined signal is transmitted as a radio signal at a predetermined timing known to a receiving side. Additionally, a propagation delay amount, which is a delay amount from a transmission timing to a reception timing of a predetermined signal received as a radio signal, is calculated on the basis of a correlation between the signal and a reference signal synchronized with the transmission timing. Furthermore, the distance between the position where a predetermined signal is transmitted and the position where the signal is received is calculated on the basis of a propagation delay amount of the signal.

18 Claims, 22 Drawing Sheets

(56) References Cited

U.S. PATENT DOCUMENTS

| | | | |
|---|---|---|---|
| 6,665,541 B1* | 12/2003 | Krasner | G01S 11/08 342/357.42 |
| 8,437,693 B2* | 5/2013 | Brown | H04B 7/2693 342/358 |
| 2002/0093452 A1 | 7/2002 | Hirata et al. | |
| 2002/0183070 A1* | 12/2002 | Bloebaum | G01S 19/21 455/456.1 |
| 2003/0011513 A1* | 1/2003 | Zhao | G01S 19/27 342/357.42 |
| 2003/0030584 A1 | 2/2003 | Hirata et al. | |
| 2007/0184864 A1* | 8/2007 | Leitch | H04W 56/0015 455/507 |
| 2010/0271263 A1* | 10/2010 | Moshfeghi | G01S 5/0263 342/378 |
| 2012/0184297 A1* | 7/2012 | Kim | G01S 5/14 455/456.1 |
| 2016/0054425 A1* | 2/2016 | Katz | G01S 3/14 342/417 |

FOREIGN PATENT DOCUMENTS

| | | |
|---|---|---|
| JP | 2010-216814 A | 9/2010 |
| JP | 2014-025744 | 2/2014 |
| WO | 2014/196316 A1 | 12/2014 |

\* cited by examiner

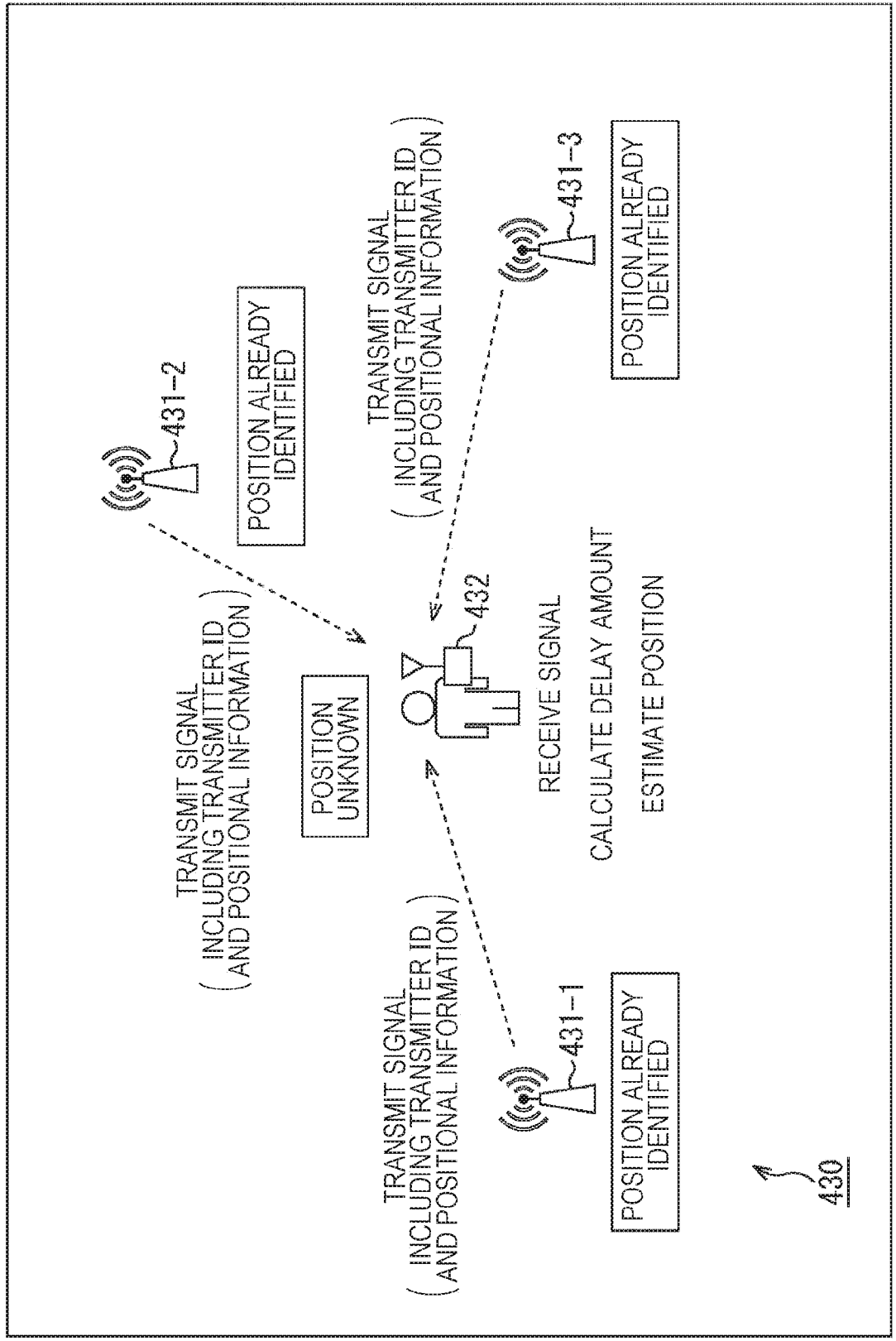

SIGNAL PROCESSING DEVICE AND METHOD, AND INFORMATION PROCESSING DEVICE AND METHOD

CROSS REFERENCE TO RELATED APPLICATIONS

This application is a U.S. National Phase of International Patent Application No. PCT/JP2016/065389 filed on May 25, 2016, which claims priority benefit of Japanese Patent Application No. JP 2015-114914 filed in the Japan Patent Office on Jun. 5, 2015. Each of the above-referenced applications is hereby incorporated herein by reference in its entirety.

TECHNICAL FIELD

The present technology relates to a signal processing device and method, an information processing device and method, and a program, and particularly relates to a signal processing device and method, an information processing device and method, and a program, in which a distance between a position where a signal is transmitted and a position where the signal is received can be obtained with higher accuracy.

BACKGROUND ART

In the related art, as a method of measuring a position of a mobile communication terminal, there is a method in which a triangle having vertexes at three base stations is defined on the basis of positional information and electric field intensity information of the base stations, and a gravity center of the triangle is obtained, and then three vectors which are directed to the respective vertexes from the gravity center and correspond to respective electric field intensity are synthesized, and a direction and a position indicated by the synthetic vector is determined as a current position of a mobile communication terminal (refer to Patent Document 1, for example). The gravity center indicates a temporary position of the mobile communication terminal, and a length of each vector indicates an electric field intensity of a signal received in each base station, namely, a distance from each base station to a position where a signal is transmitted (distance between a position where the signal is transmitted and a position where the signal is received). Additionally, the synthetic vector indicates a deviation between the temporary position and an actual position of the mobile communication terminal. In other words, the actual position of the mobile communication terminal can be obtained by obtaining the synthetic vector.

CITATION LIST

Patent Document

Patent Document 1: Japanese Patent Application Laid-Open No. 2004-356755

SUMMARY OF THE INVENTION

Problems to be Solved by the Invention

However, in a method described above, there may be a risk that accuracy of each vector length, namely, measurement accuracy for a distance between a position where a signal is transmitted and a position where the signal is received is degraded because electric field intensity is dominant in measurement accuracy and measurement accuracy for the electric field intensity is degraded due to influence of intensity change caused by multipath. Therefore, there is a risk that measurement accuracy for a position of a mobile communication terminal is degraded.

The present technology is proposed in view of the above-described situations and is directed to more accurately obtain a distance between a position where a signal is transmitted and a position where the signal is received.

Solutions to Problems

A signal processing device according to the present technology is a signal processing device including a transmission unit adapted to transmit a predetermined signal as a radio signal at a predetermined timing known to a receiving side.

The timing is a timing repeated at a predetermined time interval and capable of transmitting the signal, and the transmission unit is adapted to perform carrier sense to confirm whether communication is currently performed in a band in which the signal is to be transmitted, and in the case of confirming that the band is available, the signal is transmitted at the timing coming next.

The transmission unit can be adapted to grasp the timing on the basis of time information included in a global navigation satellite system (GNSS) signal, and transmit the signal.

The signal can include: information included in a global navigation satellite system (GNSS) signal or NULL data; and information on the signal processing device.

A generation unit adapted to generate the signal can be further included.

The signal processing method according to the present technology is a signal processing method including transmitting, by a signal processing device, a predetermined signal as a radio signal at a predetermined timing known to a receiving side.

A program according to the present technology is a program to cause a computer to function as a transmission unit adapted to transmit a predetermined signal as a radio signal at a predetermined timing known to a receiving side.

An information processing device according to the present technology is an information processing device including a propagation delay amount calculation unit adapted to calculate a propagation delay amount of a predetermined signal on the basis of a correlation between the signal received as a radio signal and a reference signal synchronized with a transmission timing, the propagation delay amount being a delay amount from the transmission timing at which the signal is transmitted as the radio signal to a reception timing at which the signal is received.

The transmission timing is any one of timings capable of transmitting the signal repeated at a predetermined time interval based on time information included in a global navigation satellite system (GNSS) signal, and the propagation delay amount calculation unit is adapted to estimate which one of the timings capable of transmitting the signals is the transmission timing on the basis of the calculated propagation delay amount.

A transmission unit adapted to transmit the propagation delay amount calculated by the propagation delay amount calculation unit to another information processing device can be further included.

A reception unit adapted to receive the signal is further included, and the propagation delay amount calculation unit is adapted to calculate the propagation delay amount of the signal received by the reception unit.

A distance calculation unit adapted to calculate a distance between a position where the signal is transmitted and a position where the signal is received on the basis of the propagation delay amount calculated by the propagation delay amount calculation unit device can be further included.

The propagation delay amount calculation unit is adapted to calculate the propagation delay amount for each of a plurality of the signals transmitted from different positions and received at the same position, the distance calculation unit is adapted to calculate, for each of the signals, a distance between a position where the signal is transmitted and a position where the signal is received on the basis of the propagation delay amount calculated by the propagation delay amount calculation unit, and the information processing device may further include: a positional information acquisition unit adapted to acquire, from each of the plurality of signals, positional information included in the signal and corresponding to information on a position where the signal is transmitted; and a position estimation unit adapted to estimate, for each of the plurality of signals, a position where the signal is received on the basis of the distance calculated by the distance calculation unit and the positional information acquired by the positional information acquisition unit acquisition unit.

An information processing method of the present technology is an information processing method including calculating, by an information processing device, a propagation delay amount of a predetermined signal on the basis of a correlation between the signal received as a radio signal and a reference signal synchronized with a transmission timing, the propagation delay amount being a delay amount from the transmission timing at which the signal is transmitted as the radio signal to a reception timing at which the signal is received.

A program according to the present technology is a program to cause a computer to function as a propagation delay amount calculation unit adapted to calculate a propagation delay amount of a predetermined signal on the basis of a correlation between the signal received as a radio signal and a reference signal synchronized with a transmission timing the propagation delay amount being a delay amount from the transmission timing at which the signal is transmitted as the radio signal to a reception timing at which the signal is received.

An information processing device according to the present technology is an information processing device including a distance calculation unit adapted to calculate a distance between a position where a predetermined signal is transmitted and a position where the signal is received on the basis of a propagation delay amount that is a delay amount from a transmission timing at which the signal is transmitted as a radio signal to a reception timing at which the signal is received as the radio signal.

The distance calculation unit is adapted to calculate a distance between a position where the signal is transmitted and each of a plurality of positions where the signal is received, and the information processing device may further include a position estimation unit adapted to estimate, on the basis of the plurality of distances calculated by the distance calculation unit, a position where the signal is transmitted.

The distance calculation unit can be adapted to calculate a distance between the position where the signal is transmitted and a position where the signal corresponding to each propagation delay amount is received, on the basis of a predetermined number of the propagation delay amounts which are selected from a plurality of the propagation delay amounts and have smaller values of the propagation delay amounts.

An information processing method according to the present technology is an information processing method in which an information processing device calculates a distance between a position where a predetermined signal is transmitted and a position where the signal is received, on the basis of a propagation delay amount that is a delay amount from a transmission timing at which the signal is transmitted as a radio signal to a reception timing at which the signal is received as the radio signal.

A program according to the present technology is a program to cause a computer to function as a distance calculation unit adapted to calculate a distance between a position where a predetermined signal is transmitted and a position where the signal is received, on the basis of a propagation delay amount that is a delay amount from a transmission timing at which the signal is transmitted as a radio signal to a reception timing at which the signal is received as the radio signal.

According to the signal processing device and method, and the program of the present technology, a predetermined signal is transmitted as a radio signal at a predetermined timing known to a receiving side.

According to the information processing device and method, and the program of the present technology, a propagation delay amount of a predetermined signal received as a radio signal is calculated on the basis of a correlation between the signal and a reference signal synchronized with a transmission timing, in which the propagation delay amount is a delay amount from a transmission timing at which the signal is transmitted as the radio signal to a reception timing at which the signal is received.

According to the information processing device and method, and the program of the present technology, a distance between a position where a predetermined signal is transmitted and a position where the signal is received is calculated on the basis of a propagation delay amount that is a delay amount from a transmission timing at which the signal is transmitted as a radio signal to a reception timing at which the signal is received as the radio signal.

EFFECTS OF THE INVENTION

According to the present technology, a signal can be processed. Also, according to the present technology, information can be processed. Furthermore, according to the present technology, a distance between a position where a signal is transmitted and a position where the signal is received can be obtained with higher accuracy.

MODE FOR CARRYING OUT THE INVENTION

Figure 1:
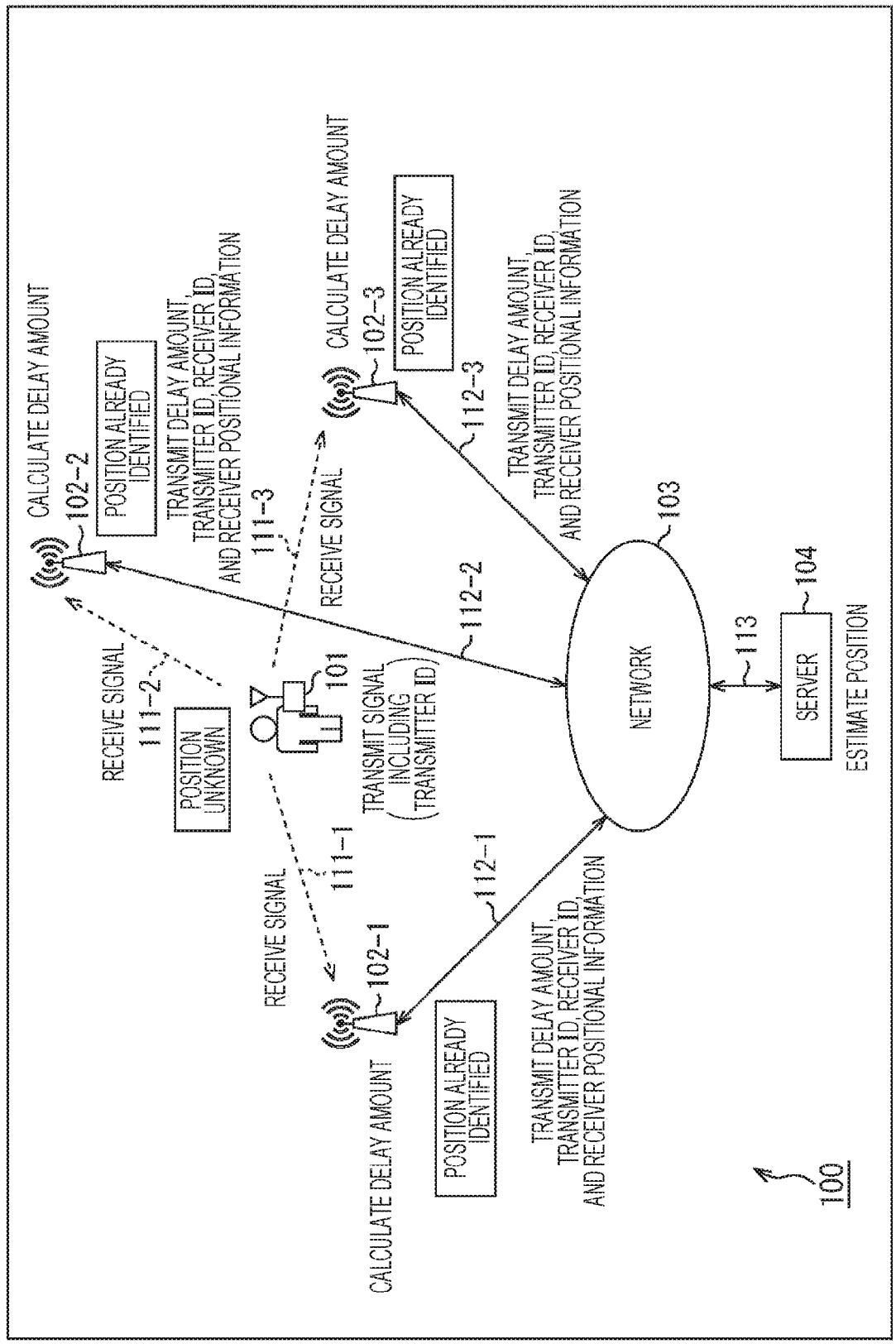
FIG. 1 is a diagram illustrating exemplary main components of a signal transmitting/receiving system.

Modes to implement the present disclosure (hereinafter referred to as "embodiment") will be described below. Note that the description will be provided in the following order.

1. First Embodiment (Signal Transmitting/Receiving System)

<1. First Embodiment>
<Estimation of Signal Transmitting Position>

For example, in communication using a mobile communication terminal such as a personal handyphone system (PHS) terminal or a cellular phone, the mobile communication terminal is connected to an existing public telephone network via a base station that covers an area where the mobile communication terminal is located, and can perform communication with a different mobile communication terminal or an ordinary wired telephone via this public telephone network.

In the case of such a communication system, communication between a mobile communication terminal and others is carried out via a base station within an area where the mobile communication terminal is located, namely, a base station closest to the mobile communication terminal out of base stations respectively provided in many areas. In other words, the base station that performs radio communication with the mobile communication terminal is preliminarily identified, and therefore, a current position of the mobile communication terminal can be estimated by identifying the base station.

However, accuracy in the above-described method of estimating a position of a mobile communication terminal depends on output power of a base station (namely, a communicable range). For example, when a communicable range of a base station is about several hundred meters to several tens of kilometers, an error in position estimation (namely, estimation of a distance from the base station to the mobile communication terminal) is also about the same, and the accuracy may be hardly improved any further.

On the other hand, for example, Patent Document 1 discloses a method in which a triangle having vertexes at base stations is defined on the basis of positional information and electric field intensity information of the three base stations and a gravity center of the triangle is obtained, and then three vectors which are directed to the respective vertexes from the gravity center and correspond to respective electric field intensity are synthesized, and a direction and a position indicated by the synthetic vector is determined as a current position of a mobile communication terminal. The gravity center indicates a temporary position of the mobile communication terminal, and a length of each vector indicates electric field intensity of a signal received in each base station, namely, a distance from each base station to a position where a signal is transmitted (distance between a position where the signal is transmitted and a position where the signal is received). Additionally, the synthetic vector indicates a deviation between the temporary position and an actual position of the mobile communication terminal. In other words, the actual position of the mobile communication terminal can be obtained by obtaining the synthetic vector.

However, in the case of this method, position estimation accuracy can be theoretically more improved than the above-described method, but the position estimation accuracy depends on the electric field intensity. Therefore, since measurement accuracy for the electric field intensity is degraded when the electric field intensity is changed due to, for example, multipath or the like, there may be a possibility that accuracy of each vector length, namely, measurement accuracy for a distance between a position where a signal is transmitted and a position where the signal is received is degraded. Therefore, there may be a possibility that an error is caused in an estimated position of the mobile communication terminal. Thus, an actual communication environment is likely to be influential, and position estimation accuracy cannot be sufficiently improved in some communication environment thereof.

<Signal Transmitting/Receiving System>

FIG. 1 is a diagram illustrating exemplary main components of an embodiment of a signal transmitting/receiving system to which the present technology is applied. The signal transmitting/receiving system 100 illustrated in FIG. 1 is a signal transmitting/receiving system capable of transmitting and receiving a radio signal and obtaining a distance between a position where a radio signal is transmitted and a position where the radio signal is received, and further capable of estimating a position where the radio signal is transmitted by using the obtained distance.

As illustrated in FIG. 1, the signal transmitting/receiving system 100 includes a transmitter 101, receivers 102-1 to 102-3, and a server 104.

The transmitter 101 is a signal processing device adapted to transmit a radio signal. The transmitter 101 is a movable device such as a portable communication device. For example, the transmitter 101 is carried by a user or installed in some movable body such as a car. Also, the transmitter 101 itself may have a function to move. In other words, a position of the transmitter 101 is unfixed, and a position of the transmitter 101 is unclear (unknown) unless the position thereof is identified by the signal transmitting/receiving system 100.

Meanwhile, one transmitter 101 is illustrated in FIG. 1, but the signal transmitting/receiving system 100 can include arbitrary number of transmitters 101.

The receivers 102-1 to 102-3 are signal processing devices each adapted to receive a radio signal transmitted by the transmitter 101. Additionally, the receivers 102-1 to 102-3 are also information processing devices each adapted to process information. The receivers 102-1 to 102-3 are installed in a fixed manner in installation places and are immovable devices. The receivers 102-1 to 102-3 are installed at positions different from each other. In other words, the positions of the receivers 102-1 to 102-3 are already identified and known.

The receivers 102-1 to 102-3 are communicably connected to a network 103 as indicated by double-headed arrows 112-1 to 112-3, respectively. The receivers 102-1 to 102-3 communicate with other communication devices connected to the network 103 via this network 103 and can exchange information. For example, the receivers 102-1 to 102-3 can communicate with the server 104 via the network 103. In other words, the receivers 102-1 to 102-3 are also communication devices adapted to communicate with other devices.

In the case where there is no need to describe the receivers 102-1 to 102-3 distinguished from each other, each thereof will be referred to as a receiver 102. Meanwhile, the three receivers 102-1 to 102-3 are illustrated in FIG. 1, but the signal transmitting/receiving system 100 may include the arbitrary number of receivers 102.

The network 103 is an arbitrary communication network, and may perform wired communication, may perform radio communication, or may perform both thereof. Further, the network 103 may be formed of one communication network or may be formed of a plurality of communication networks. For example, the network 103 may include a communication network or a communication path of an arbitrary communication standard, for example: a wide area communication network for a radio mobile unit such as the Internet, a public telephone line network, a so-called 3G line or a 4G line; a radio communication network to perform communication compliant with a wide area network (WAN), a local area network (LAN), or Bluetooth (registered trademark); a short-range radio communication path such as near field communication (NFC); an infrared communication path; a communication network of wired communication compliant with a standard such as high-definition multimedia interface (HDMI) (registered trademark) or a universal serial bus (USB); or the like.

The server 104 is an information processing device adapted to process information. The server 104 is communicably connected to the network 103 as indicated by a double-headed arrow 113. The server 104 communicates with other communication devices connected to the network 103 via the network 103 and can exchange information. For example, the server 104 can communicate with the receivers 102-1 to 102-3 via the network 103. In other words, the server 104 is also a communication device adapted to communicate with other devices.

In the signal transmitting/receiving system 100 having the above-described configuration, the transmitter 101 transmits a predetermined signal as a radio signal at a predetermined timing known to a receiving side (receiver 102 in the case of FIG. 1).

The radio signal is received by the receiver 102 having a position of the transmitter 101 within a communicable range. For example, a radio signal transmitted from the transmitter 101 is received by the receiver 102-1 as indicated by a dotted arrow 111-1. Also, for example, a radio signal transmitted from the transmitter 101 is received by the receiver 102-2 as indicated by a dotted arrow 111-2. Furthermore, for example, a radio signal transmitted from the transmitter 101 is received by the receiver 102-3 as indicated by a dotted arrow 111-3.

Figure 2A:
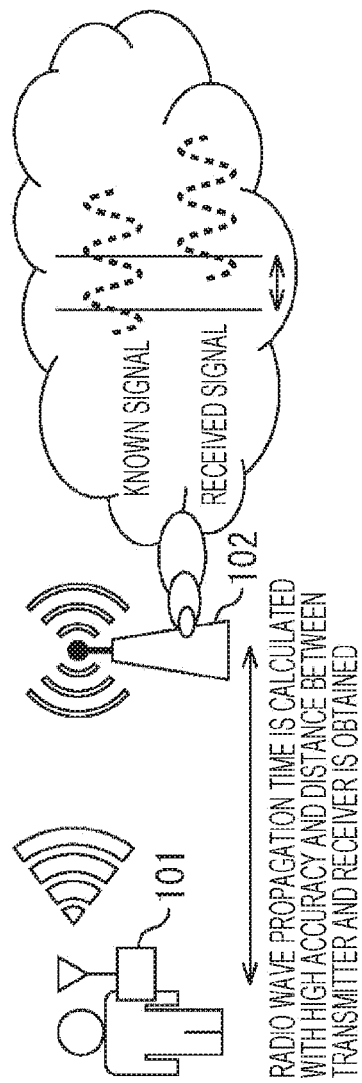
FIGS. 2A and 2B are diagrams to describe an exemplary state of estimating a position of a transmitter.

As illustrated in FIG. 2A, each receiver 102 having received a radio signal from the transmitter 101 obtains a propagation delay amount of the radio signal (namely, a time from a transmission timing at which the radio signal is transmitted to a reception timing at which the radio signal is received). As described above, the transmission timing is the timing known to the receiver 102. Additionally, the reception timing is also known to the receiver 102. Therefore, the receiver 102 can obtain the propagation delay amount. Each receiver 102 supplies the server 104 with the propagation delay amount together with positional information indicating an own position thereof.

Figure 2B:
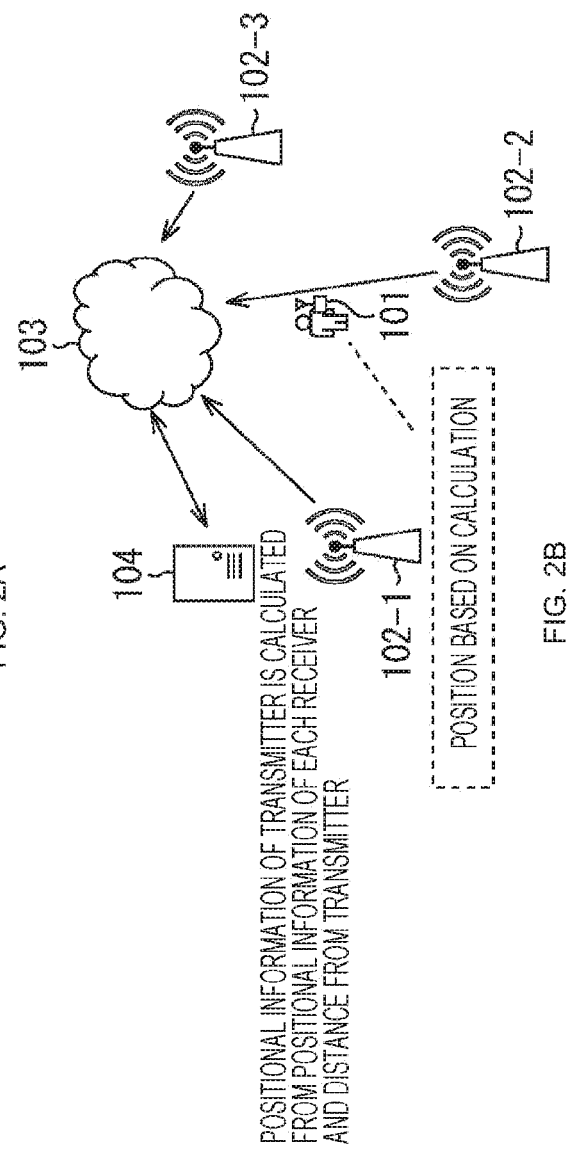

As illustrated in FIG. 2B, the server 104 obtains a distance between the transmitter 101 and each receiver 102 on the basis of the propagation delay amount acquired from the receiver 102. The server 104 further estimates a position of the transmitter 101 on the basis of the obtained distance and the positional information of each receiver 102.

Thus, the signal transmitting/receiving system 100 obtains the distance between the transmitter 101 and the receiver 102 on the basis of not electric field intensity but the propagation delay amount of the radio signal from the transmitter 101 to the receiver 102. Therefore, the signal transmitting/receiving system 100 can more accurately obtain a distance between a position where a signal is transmitted and a position where the signal is received (namely, the distance between the transmitter 101 that transmits a radio signal and the receiver 102 that receives the radio signal). Furthermore, the signal transmitting/receiving system 100 can more accurately estimate the position where the signal is transmitted (namely, the position of the transmitter 101) by using the distance.

<Configuration of Transmitter>

Figure 3:
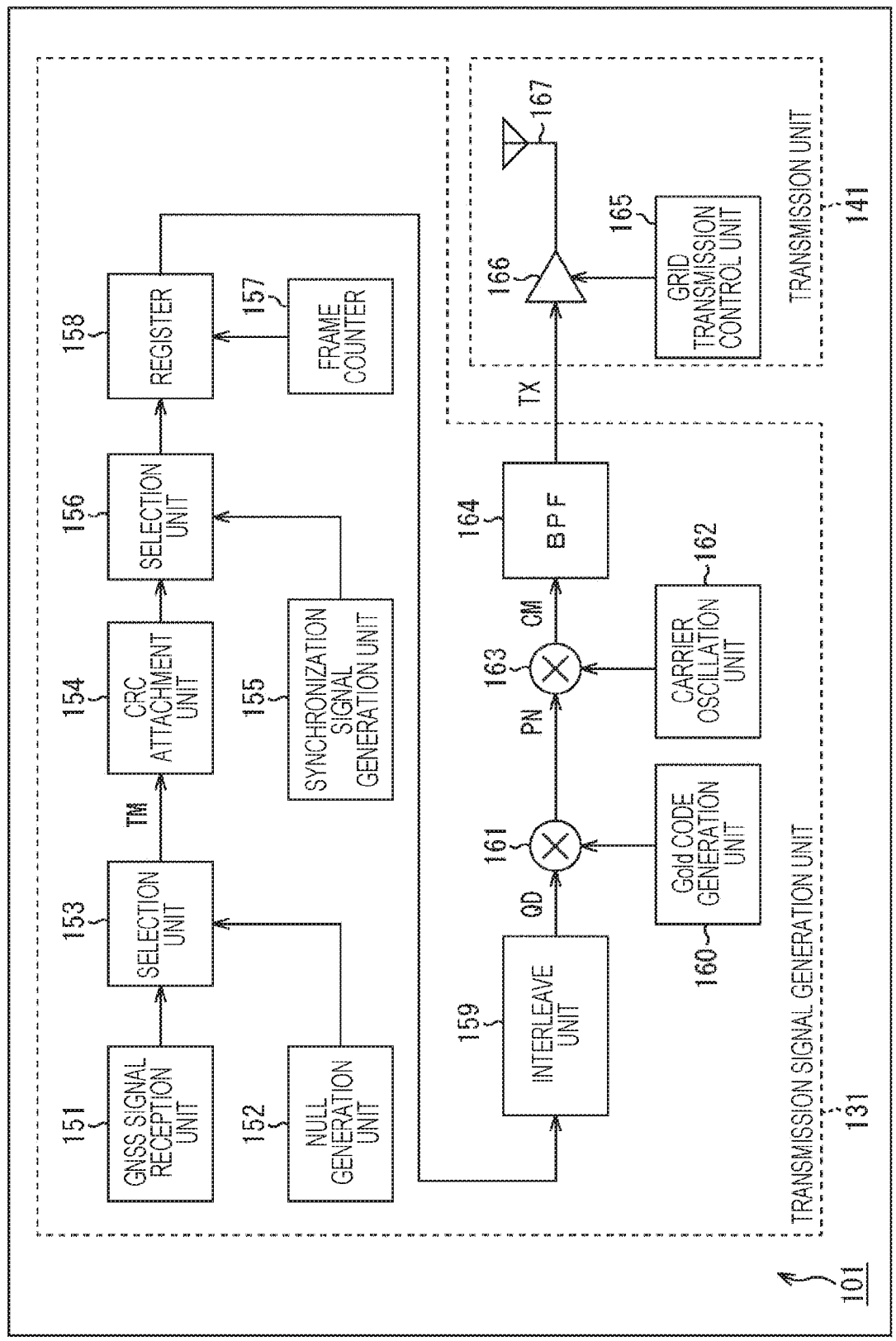
FIG. 3 is a block diagram illustrating exemplary main components of the transmitter.

FIG. 3 is a block diagram illustrating exemplary main components of the transmitter 101 in FIG. 1. As illustrated in FIG. 3, the transmitter 101 includes a transmission signal generation unit 131 and a transmission unit 141.

The transmission signal generation unit 131 generates a predetermined signal to be transmitted as a radio signal. The transmission unit 141 transmits the predetermined signal generated by the transmission signal generation unit 131 as a radio signal.

As illustrated in FIG. 3, the transmission signal generation unit 131 includes a GNSS signal reception unit 151, a NULL generation unit 152, a selection unit 153, a cyclic redundancy check (CRC) attachment unit 154, a synchronization signal generation unit 155, a selection unit 156, a frame counter 157, a register 158, an interleave unit 159, a Gold code generation unit 160, a multiplication unit 161, a carrier oscillation unit 162, a multiplication unit 163, and a band pass filter (BPF) 164.

The GNSS signal reception unit 151 performs processing related to reception of a GNSS signal transmitted from a satellite (GNSS satellite) of a global positioning system. Additionally, the GNSS signal reception unit 151 acquires time information from the received GNSS signal. Then, the GNSS signal reception unit 151 supplies the selection unit 153 with the time information. The GNSS signal reception unit 151 also supplies a later-described grid transmission control unit 165 with the time information.

The NULL generation unit 152 generates NULL data. The NULL generation unit 152 supplies the selection unit 153 with the generated NULL data.

The selection unit 153 selects either the supplied time information or the NULL data. The selection unit 153 supplies the CRC attachment unit 154 with the selected time information or NULL data as transmission information TM.

The CRC attachment unit 154 attaches a cyclic redundancy check code (CRC) for error detection to the transmission information TM supplied from the selection unit 153. The cyclic redundancy check code may be anything, and a data length thereof is also arbitrary. The CRC attachment unit 154 supplies the selection unit 156 with the transmission signal TM attached with the cyclic redundancy check code.

The synchronization signal generation unit 155 generates a predetermined synchronization pattern. This synchronization pattern may be anything, and a data length thereof is also arbitrary. The synchronization signal generation unit 155 supplies the selection unit 156 with the synchronization pattern.

The selection unit 156 selects an appropriate input, thereby attaching the synchronization pattern supplied from the synchronization signal generation unit 155 to the transmission information TM attached with the cyclic redundancy check code and supplied from the CRC attachment unit 154. In other words, the selection unit 156 generates the transmission information TM as a predetermined signal to be transmitted as a radio signal. The selection unit 156 supplies the register 158 with the transmission information TM attached with the cyclic redundancy check code and the synchronization pattern.

The frame counter 157 counts the number of repeated transmission of the transmission information TM attached with the cyclic redundancy check code and the synchronization pattern, namely, the number of times of reading the transmission information TM held in the register 158 and attached with the cyclic redundancy check code and the synchronization pattern. The frame counter 157 supplies the register 158 with such a count value.

The register 158 holds the transmission information TM supplied from the selection unit 156 and attached with the cyclic redundancy check code and the synchronization pattern. The register 158 supplies the interleave unit 159 with the transmission information TM being held and attached with the cyclic redundancy check code and the synchronization pattern. The register 158 repeats such supply predetermined number of times. As described above, the frame counter 157 counts the number thereof, and the register 158 grasps the number of times of supply on the basis of the count value. When reading of the transmission information TM attached with the cyclic redundancy check code and the synchronization pattern is repeated the predetermined number of times, the register 158 discards the transmission information TM attached with the cyclic redundancy check code and the synchronization pattern, and acquires transmission information TM supplied from the selection unit 156 and attached with a new cyclic redundancy check code and a new synchronization pattern.

The interleave unit 159 decomposes the synchronization pattern of the transmission information TM attached with the cyclic redundancy check code and the synchronization pattern, and disperses decomposed pieces between other portions. Such dispersion is performed so as to scatter the decomposed synchronization patterns substantially uniformly. The interleave unit 159 supplies the multiplication unit 161 with rearranged transmission information QD.

The Gold code generation unit 160 generates a pseudo random number sequence to be attached to transmission information QD. This pseudo random number sequence may be anything, and a data length thereof is also arbitrary. The Gold code generation unit 160 supplies the multiplication unit 161 with the generated pseudo random number sequence.

The multiplication unit 161 generates a pseudo random number sequence PN by multiplying the transmission information QD supplied from the interleave unit 159 by the pseudo random number sequence supplied from the Gold code generation unit 160. The multiplication unit 161 supplies the multiplication unit 163 with the generated pseudo random number sequence PN.

The carrier oscillation unit 162 oscillates a predetermined frequency (carrier frequency), and generates a carrier signal used to transmit a radio signal. The carrier oscillation unit 162, the carrier oscillation unit 162 supplies the multiplication unit 163 with the generated carrier signal.

The multiplication unit 163 modulates a polarity of the carrier signal supplied from the carrier oscillation unit 162 in accordance with the pseudo random number sequence PN supplied from the multiplication unit 161. The multiplication unit 163 supplies the band pass filter 164 (BPF) with a modulation result thereof as a modulation signal CM.

The band pass filter 164 limits a band of the modulation signal CM supplied from the multiplication unit 163 to a band of the carrier frequency. The band pass filter 164 supplies, as a transmission signal TX, the transmission unit 141 (amplification unit 166) with the modulation signal CM having the band thus limited.

Additionally, as illustrated in FIG. 3, the transmission unit 141 includes the grid transmission control unit 165, the amplification unit 166, and an antenna 167.

The grid transmission control unit 165 controls the amplification unit 166 and performs processing related to control for a transmission timing of a transmission signal TX.

The amplification unit 166 amplifies the transmission signal TX supplied from the band pass filter 164 at the transmission timing controlled by the grid transmission control unit 165, and transmits the amplified transmission signal TX as a radio signal via the antenna 167.

<Flow of Transmission Processing>

An exemplary flow of the transmission processing executed in the above-described transmitter 101 will be described with reference to a flowchart in FIG. 4.

In the transmission processing, the transmission signal generation unit 131 generates transmission information TM to be transmitted by processing in steps S101 to S104. In other words, when the transmission processing is started, the GNSS signal reception unit 151 receives a GNSS signal transmitted from a GNSS satellite in step S101 via an antenna not illustrated.

In step S102, the selection unit 153 determines whether the GNSS signal reception unit 151 can receive the GNSS signal. In the case of determining that the GNSS signal can be received, the GNSS signal reception unit 151 acquires time information from the received GNSS signal and supplies the same to the selection unit 153 in step S103. The selection unit 153 selects the time information and supplies the same to the CRC attachment unit 154 as transmission information TM.

Additionally, in the case of determining that the GNSS signal cannot be received in step S102 because, for example, the transmitter 101 is located indoors or the like, the NULL generation unit 152 generates NULL data in step S104 and transmits the same to the selection unit 153. The selection unit 153 selects the NULL data and supplies the same to the CRC attachment unit 154 as the transmission information TM.

Since the GNSS signal can also be received in the receiver 102, the time information is known to the receiver 102. Additionally, the NULL data is also known to the receiver 102. Thus, the transmission signal generation unit 131 generates the transmission information TM by using the information known to the receiver 102.

The transmission signal generation unit 131 generates a transmission signal TX by using the transmission information TM. The transmitter 101 transmits the transmission information TM by a method compliant with a direct sequence spread spectrum (DSSS) system. The DSSS is a technology by which highly sensitive receipt can be achieved excluding influence of noise by multiplying a received signal by a spread code and integrating the same. Sensitivity can be linearly increased by extending an integration time (in other words, lowering a transfer rate). Therefore, the transmitter 101 can achieve radio communication in a longer distance by transmitting a signal by the method compliant with the DSSS system. In other words, calculation accuracy of a propagation delay amount can be improved by transmitting a signal by the method compliant with the DSSS system. Therefore, the transmission signal generation unit 131 generates a transmission signal TX compliant with the DSSS system.

Additionally, the transmitter 101 transmits the transmission signal TX by using radio waves in a 920 MHz band. The 920 MHz band is a frequency band lifted by the Ministry of Internal Affairs and Communications from July 2011, and can be used by anyone without a license. However, according to the provision (Association of Radio Industries and Businesses (ARIB) STD T-108), a maximum continuous transmission time is limited to 4 seconds. Furthermore, in the case where a continuous transmission time is further shortened to, for example, 0.2 seconds, more channels are allocated, and transmission and reception can be performed with little interference.

Figure 5:
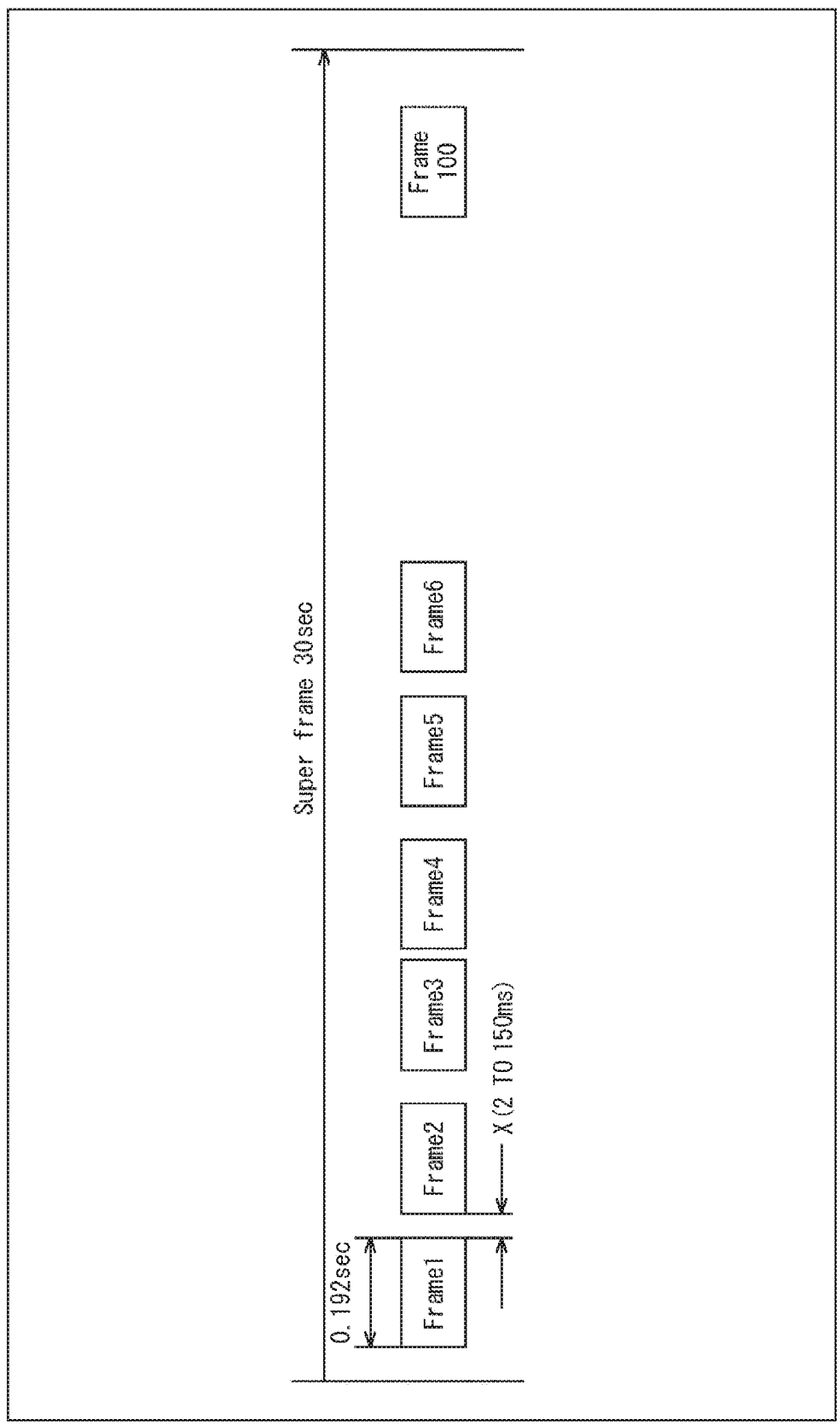
FIG. 5 is a diagram illustrating exemplary main components of a super frame.

Therefore, the transmitter 101 performs one data transmission per unit of, for example, a 30-second super frame as illustrated in FIG. 5. During the 30 seconds, a frame of 0.192 seconds is repeated one hundred times at a maximum. In other words, since the continuous transmission time is less than 0.2 seconds, many transmission channels can be allocated to this transmission. As a result, transmission can be performed by selecting a channel relatively available, and a system robust to interference can be constructed.

Note that a gap x between frames is a time of at least 2 ms or more. In the case of utilizing the 920 MHz band in Japan, carrier sense to confirm whether communication is currently performed in the band must be performed before signal transmission. Then, only in the case where the bandwidth is available, a signal can be transmitted. Therefore, the 920 MHz cannot be constantly used. Therefore, the gap x may be different each time depending on a result of carrier sense (namely, a channel congestion level). In the case of taking an average during 30 seconds, a frame is transmitted every approximately 0.3 seconds. As a result, 100 frames are transmitted during the 30 seconds. The number of frames that can be transmitted is slightly changed depending on the channel congestion level. Signals transmitted in the frames one hundred times are arbitrary, but the following description will be provided assuming that the signals are all the same.

Figure 6:
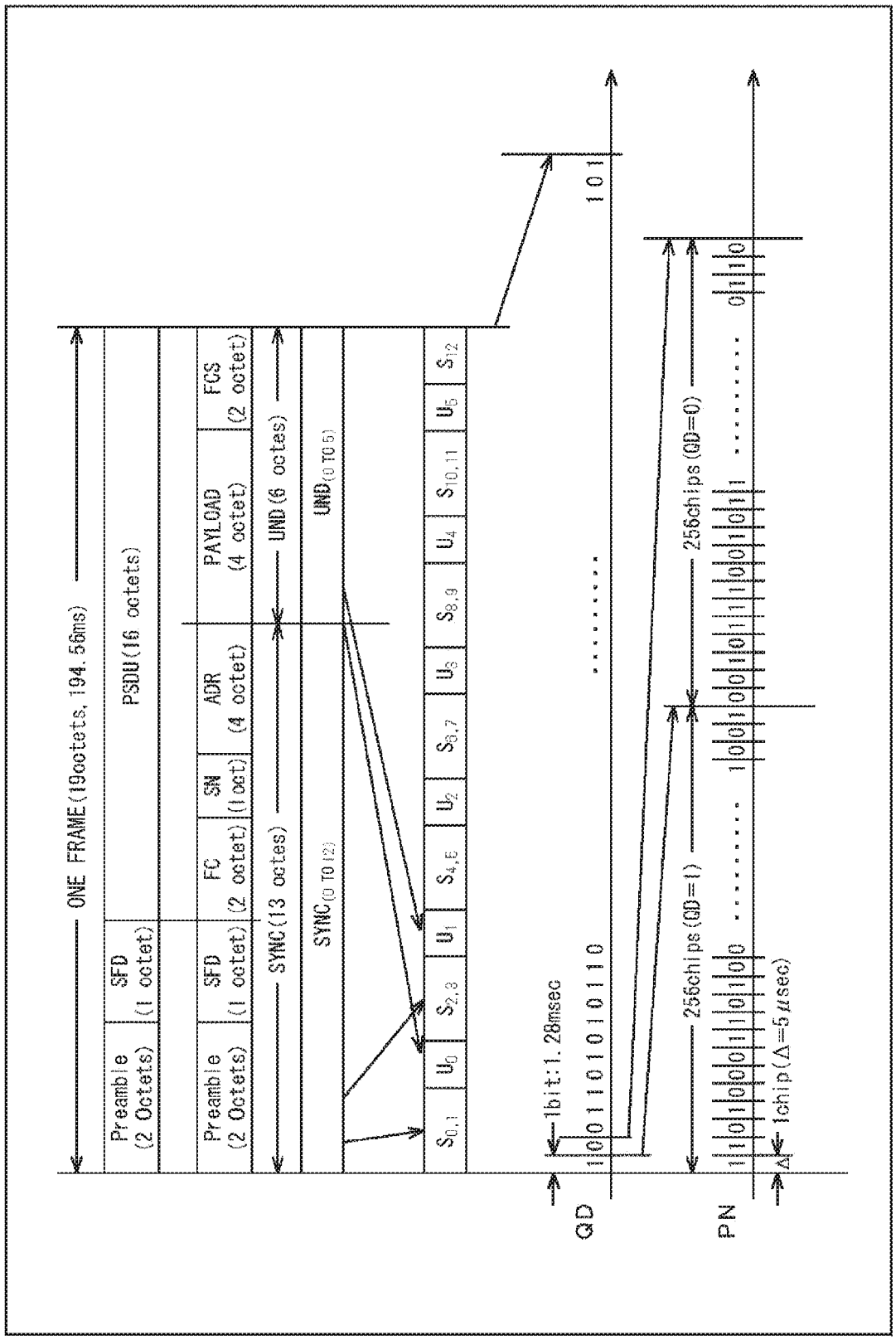
FIG. 6 is a diagram to describe an exemplary signal in each unit.

FIG. 6 is a schematic diagram illustrating an exemplary frame format of a transmission packet. As illustrated in a first row from the top in FIG. 6, the transmission packet includes a 2-octet preamble (Preamble), a 1-octet start-of-frame delimiter (SFD), and a 16-octet PHY service data unit (PSDU). Here, the Preamble and the SFD are fixed data. Values thereof are arbitrary. The preamble may be, for example, a bit string "0011111101011001". Also, the SFD may be a bit string "00011100", for example.

As illustrated in a second row from the top in FIG. 6, the 16-octet PSDU includes a frame control (FC), a sequence number (SN), a transceiver address (ADR), a payload (PAYLOAD), and a frame check sequence (FCS).

The frame control (FC) is 2-octet digital information and also is information indicating a structure of information following the frame control, the number of bits, and the like. The frame control is an arbitrary fixed bit string, and may be a bit string "0010000000100110", for example. The sequence number (SN) is 1-octet digital information and is counted up every time new data is transmitted. Whether new data is transmitted can be determined in a receiver side by checking this sequence number. The transceiver address (ADR) is 4-octet information and includes a transmitter address number (transmitter ID) to identify the transmitter 101. The payload (PAYLOAD) is 4-octet digital information in which the transmission information TM is set as it is. The frame check sequence (FCS) is a 2-octet cyclic redundancy check code and also is information to check whether any error is generated in communication data.

Figure 4:
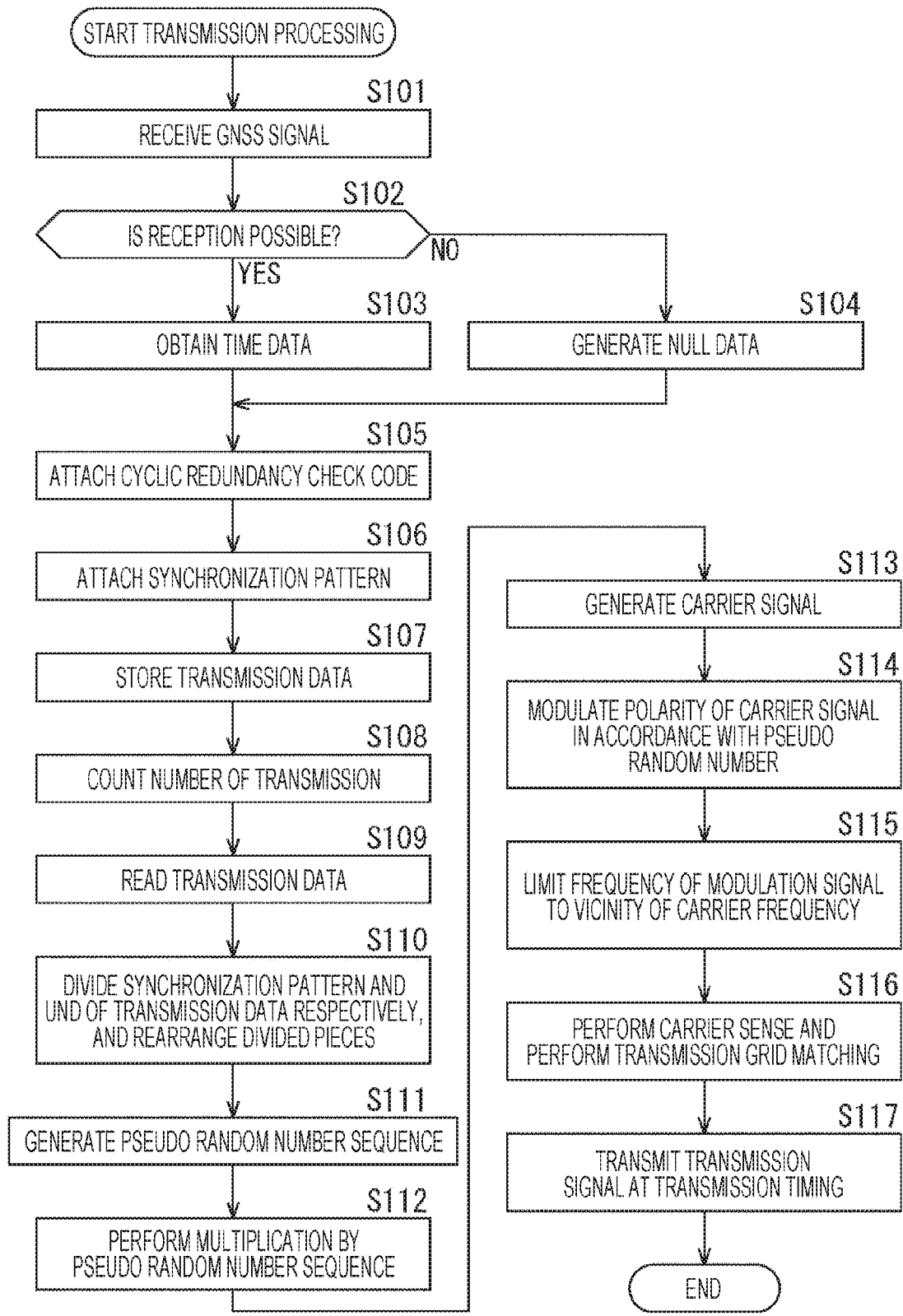
FIG. 4 is a flowchart illustrating an exemplary flow of transmission processing.

The transmission signal generation unit 131 generates a transmission signal TX from the transmission information TM by processing in steps S105 to S115 in FIG. 4.

In step S105, the CRC attachment unit 154 attaches a cyclic redundancy check code (CRC) for error detection to the transmission information TM supplied from the selection unit 153. In other words, the transmission information TM is copied as a PAYLOAD and attached with an FCS in each frame. The CRC attachment unit 154 supplies the same to the selection unit 156.

In step S106, the synchronization signal generation unit 155 generates a synchronization pattern. For example, the synchronization signal generation unit 155 generates a Preamble, an SFD, a FC, an SN, an ADR, and the like as the synchronization pattern (SYNC). The synchronization signal generation unit 155 supplies the selection unit 156 with the synchronization pattern including the Preamble, SFD, FC, SN, ADR, and the like. The selection unit 156 attaches the synchronization pattern (SYNC) to the transmission information TM attached with the cyclic redundancy check code (namely, PAYLOAD attached with the FCS) supplied from the CRC attachment unit 154.

In step S107, the register 158 stores the transmission information TM supplied from the selection unit 156 and attached the cyclic redundancy check code and the synchronization pattern (namely, PAYLOAD attached with the FCS and SYNC). In step S108, the frame counter 157 counts the number of times of transmission of the transmission information TM, namely, the number of times of reading the transmission information TM stored in the register 158 and attached with the cyclic redundancy check code and the synchronization pattern. In step S109, the interleave unit 159 reads the transmission information TM stored in the register 158 and attached with the cyclic redundancy check code and the synchronization pattern.

Every time the transmission information TM attached with the cyclic redundancy check code and the synchronization pattern is read, the frame counter 157 increments a count value by "+1", and in the case of reaching a predetermined maximum value, the count value is reset and returned to an initial value. For example, as described above, since the transmitter 101 transmits a frame one hundred times as a super frame, the frame counter 157 counts from the initial value from "0" to the maximum value "99". Note that the initial value, maximum value, and a value to be incremented are arbitrary. These values may be set in accordance with the number of frames transmitted as a super frame.

The count value of the frame counter 157 is supplied to the register 158. The register 158 holds transmission information TM attached with a cyclic redundancy check code and a synchronization pattern until the count value is reset, and repeatedly supplies the interleave unit 159 with the transmission information TM attached with the cyclic redundancy check code and the synchronization pattern. Then, when the count value is reset, the register 158 discards the transmission information TM being held and attached with the cyclic redundancy check code and the synchronization pattern, and holds transmission information TM supplied from the selection unit 156 and attached with a new cyclic redundancy check code and a new synchronization pattern. Then, reading for such transmission information TM attached with a cyclic redundancy check code and a synchronization pattern is repeated in a similarly manner. Since transmission information TM is thus read from the register 158, the processing subsequent to step S110 is executed for each transmission information TM read from the register 158. In other words, the processing subsequent to step S110 is executed every time transmission information TM is read from the register 158. In other words, the processing subsequent to step S108 is repeatedly executed the number of times equivalent to the number of repeated reading as for the processing up to step S107.

In step S110, the interleave unit 159 divides, into a plurality of pieces, a synchronization pattern (SYNC) of the transmission information TM and an UND respectively, and rearranges the divided pieces, in which the synchronization pattern is read from the register 158 and attached with a cyclic redundancy check code and the synchronization pattern, and the UND is a remaining portion.

For example, as illustrated in a fourth row from the top in FIG. 6, the interleave unit 159 decomposes the synchronization pattern (SYNC) and disperses the decomposed pieces between the divided pieces of the UND. Such dispersion is performed so as to scatter the decomposed synchronization pattern (SYNC) substantially uniform.

In the exemplary case in FIG. 6, the synchronization pattern (SYNC) is 13-octet information, and the UND is 6-octet information. The interleave unit 159 decomposes the 13-octet synchronization pattern (SYNC) by one octet, defines the decomposed pieces as SYNC0 to SYNC12, decomposes 6-octet UND by 1 octet, defines the decomposed pieces as UND0 to UND5, and rearranges these pieces in the following order, for example.

SYNC0, SYNC1, UND0, SYNC2, SYNC3, UND1, ..., UND5, SYNC12

By thus transmitting the synchronization pattern known to the receiver 102 in a manner scattered (dispersed) in the entire frame, a frequency and an initial phase of a transmission carrier can be estimated in the receiver 102 per short frame with higher accuracy. As a result, even in the case of a short continuous transmission time, the receiver 102 can perform highly sensitive receipt.

Figure 7:
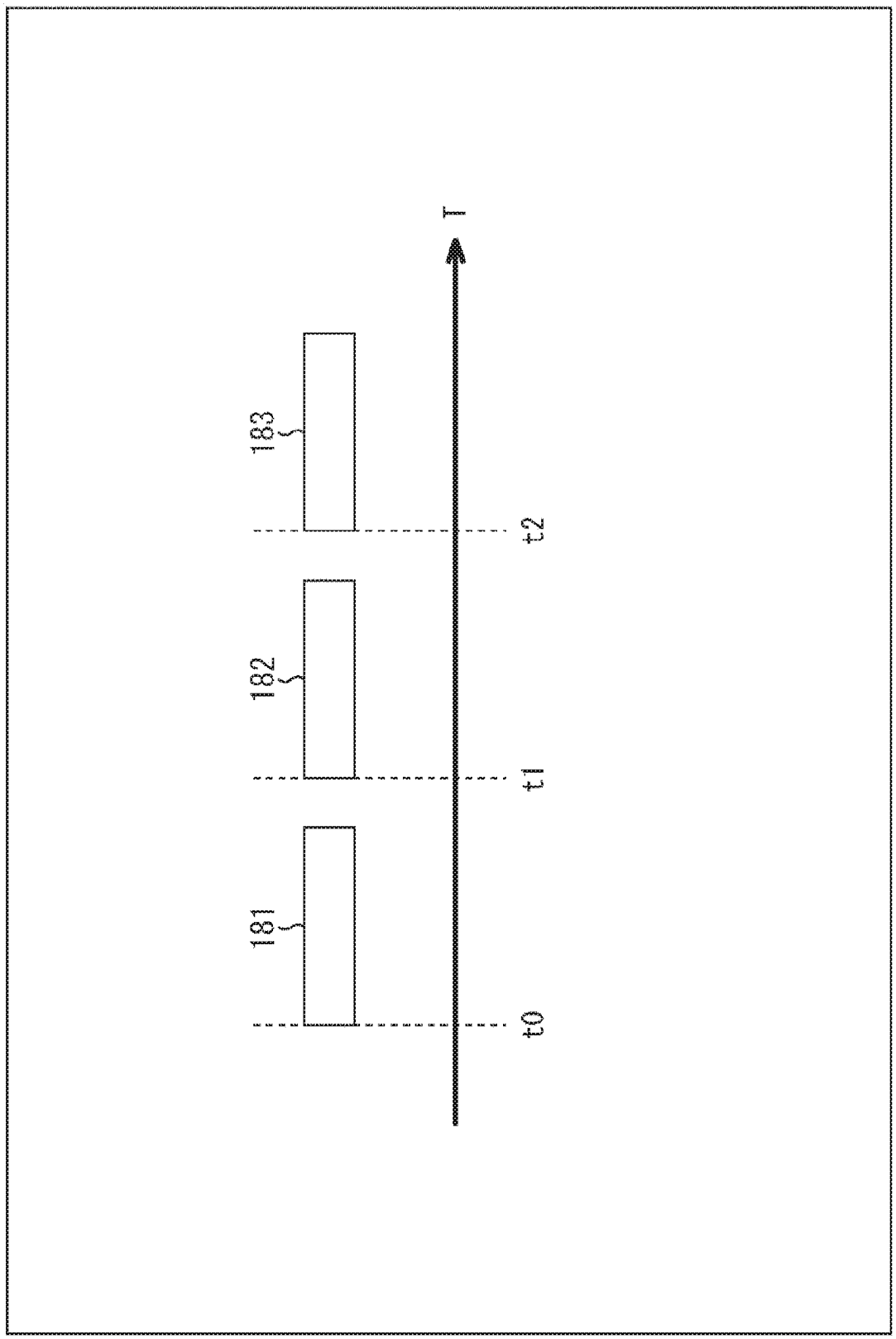
FIG. 7 is a diagram to describe an exemplary state of grid transmission.

An example of the rearranged transmission information QD is illustrated in a fifth row from the top in FIG. 7. The interleave unit 159 supplies the multiplication unit 161 with the transmission information QD rearranged as described above.

In step S111, the Gold code generation unit 160 generates a predetermined pseudo random number sequence. For example, the Gold code generation unit 160 may generate a bit string of a predetermined pattern having a length of 256 bits as a pseudo random number sequence. For example, the Gold code generation unit 160 may be formed of two maximum sequence (M-sequence) generators.

In step S112, the multiplication unit 161 multiplies the transmission information QD supplied from the interleave unit 159 by the pseudo random number sequence generated by the Gold code generation unit 160, and generates a pseudo random number sequence PN. In other words, the multiplication unit 161 allocates a pseudo random number sequence to each bit of the transmission information QD, and generates a pseudo random number sequence PN of, for example, 38400 bits (152 bits×256 chips) from each transmission packet.

At this point, in a pseudo random number sequence allocated to a bit having a value "0" of transmission information QD (QD=0) and a pseudo random number sequence allocated to a bit having a value of "1" thereof (QD=1), values of the respective bits are inverted to each other. In other words, for example, the multiplication unit 161 allocates a pseudo random number sequence to a bit having a value "0" of the transmission information QD (QD=0), and allocates, to a bit having a value "1" of the transmission information QD (QD=1), a pseudo random number sequence in which respective bits are inverted. For example, as illustrated in a lowermost row in FIG. 6, the multiplication unit 161 allocates a pseudo random number sequence "1101000110100 . . . 1001" to the bit having a value "1" of the transmission information QD (QD=1), and allocates a pseudo random number sequence "0010111001011 . . . 0110" to the bit having a value "0" thereof (QD=0).

In this pseudo random number sequence PN, a spread coefficient is 256 and a chip interval $\Delta$ is 5 µs. The multiplication unit 161 supplies the multiplication unit 163 with the pseudo random number sequence PN thus generated.

In step S113, the carrier oscillation unit 162 generates a carrier signal.

In step S114, the multiplication unit 163 modulates a polarity of the carrier signal in accordance with the pseudo random number sequence PN, and generates a modulation signal CM. In other words, the multiplication unit 163 performs BPSK modulation as a DSSS system. For example, in the case where the pseudo random number sequence PN is "1", modulation is performed such that a carrier phase becomes $\pi$, and in the case where the pseudo random number sequence PN is "0", modulation is performed such that the carrier phase becomes $-\pi$ (polarity inverted). The multiplication unit 163 supplies the band pass filter 164 with the modulation result as the modulation signal CM.

In step S115, the band pass filter 164 limits a frequency of the modulation signal CM to the vicinity of a carrier frequency, and generates a transmission signal TX. Since the modulation signal CM having the polarity inverted is changed rapidly at a switching point portion, frequency components are spread over a wide range. In the case of performing radio communication in this state, a similar band may be influenced. Since the band pass filter 164 limits frequency components of the modulation signal CM to the vicinity of the carrier frequency, such influence to other bands can be suppressed. The band pass filter 164 supplies the transmission signal TX to the amplification unit 166 of the transmission unit 141.

The transmission unit 141 transmits the transmission signal TX as a radio signal by processing in step S116 and step S117 in FIG. 4.

In step S116, the grid transmission control unit 165 controls a transmission timing that is the timing to transmit the transmission signal TX as the radio signal. More specifically, the grid transmission control unit 165 controls the amplification unit 166 such that the transmission signal TX is transmitted at the timing known to the receiver 102 (for example, a known predetermined time).

Consequently, the transmission timing can be grasped in the receiver 102 with higher accuracy. Since a reception timing to receive a radio signal is known to the receiver 102 adapted to receive the radio signal, a propagation delay amount of the radio signal can be more accurately obtained by the receiver 102 grasping the transmission timing with higher accuracy. Therefore, a distance between a position where the signal is transmitted and a position where the signal is received can be obtained with higher accuracy.

Note that there may be a plurality of timings known to the receiver 102. For example, all of the plurality of timings at which the transmitter 101 can transmit the transmission signal TX may be a timing known to the receiver 102. Additionally, the transmitter 101 may transmit a transmission signal TX at any of these transmittable timings. For example, the grid transmission control unit 165 may select one or more timings from among the plurality of timings such that a transmission signal(s) TX is (are) transmitted at the selected timing or timings. Note that the receiver 102 can estimate, on the basis of a propagation delay amount and the like, a timing at which a transmission signal TX is transmitted although the details will be described later.

The plurality of timings at which the transmission signal TX can be transmitted may include, for example, timings regularly or irregularly repeated on a time axis as illustrated in FIG. 7. In the exemplary case in FIG. 7, a timing at which the transmission signal TX can be transmitted is repeatedly provided along the time axis, such as times t0, t1, t2, and the like.

In this case, for example, the grid transmission control unit 165 may cause the transmission unit 141 to transmit a transmission signal TX at a next transmittable timing after the transmission unit 141 has become able to transmit the transmission signal TX. In the example of FIG. 7, a frame 181 is transmitted at time t0, a frame 182 is transmitted at time t1, and a frame 183 is transmitted at time t2. In other words, in this case, a transmission signal TX of each frame is transmitted in accordance with the transmittable timing (time) (transmission grid matching is performed).

Generally, since the larger the number of timings known to the receiving side is, the more opportunities are, radio signals are easily transmitted in accordance with the timings known to the receiving side. For example, in a case where the number of timing known to the receiving side is once, a radio signal cannot be transmitted at the timing known to the receiving side when this timing is missed. On the other hand, in the case where the number of timing known to the receiving side is a plurality of times, a radio signal may be able to be transmitted at a different timing even when one timing thereof is missed. Therefore, a distance between a position where a signal is transmitted and a position where the signal is received can be more easily obtained by increasing the number of timings known to the receiving side.

Meanwhile, as described above, in the case of communication in the 920 MHz band in Japan, carrier sense is needed to be performed before transmission, and in the case where the band is occupied, transmission cannot be performed. Therefore, transmission cannot be constantly performed at all of transmittable timings. Accordingly, in this case, the grid transmission control unit 165 executes carrier sense for the frequency band (such as the 920 MHz band) in which the transmission signal TX is to be transmitted, and in the case of confirming that the band is available, the grid transmission control unit 165 causes the transmission unit 141 to transmit a transmission signal TX at a next transmittable timing (timing known to the receiving side). In other words, transmission grid matching is performed.

Note that the grid transmission control unit 165 may perform such grid matching on the basis of time information included in a GNSS signal. For example, the grid transmission control unit 165 may acquire the time information from the GNSS signal reception unit 151, and perform grid matching on the basis of the time information. The GNSS signal can also be received at the receiver 102. Therefore, time adjustment (timing adjustment) with the receiver 102 can be more easily performed by using the time information. In other words, the receiver 102 can grasp the transmission timing more easily and more accurately, and a propagation delay amount can be obtained with higher accurately. In other words, a distance between a position where a signal is transmitted and a position where the signal is received can be obtained with higher accuracy.

In step S117, the amplification unit 122 amplifies the transmission signal TX at a transmission timing designated by the grid transmission control unit 165, and transmits the same as a radio signal via the antenna 167.

The processing in the above-described respective steps can be executed in an arbitrary order, can also be executed in parallel, and are repeatedly executed as necessary. Additionally, the respective processing of the transmission processing is repeatedly executed while input of data to be transmitted continues.

The transmitter 101 can transmit a transmission signal TX as a radio signal at a predetermined timing known to the receiving side by executing the transmission processing as described above. Consequently, a distance between a position where a signal is transmitted and a position where the signal is received can be obtained with higher accuracy.

Furthermore, the transmitter 101 disperses a synchronization pattern (SYNC) known to the receiver 102 substantially uniformly in a transmission frame, and can perform transmission as a frame of 0.2 seconds or less, and degradation of reception sensitivity can be suppressed.

<Others>

Note that a frequency band in which the transmitter 101 transmits a transmission signal TX is arbitrary, and may be a band other than 920 MHz. For example, it may be a band not requiring carrier sense. In this case, the above-described processing related to carrier sense can be omitted. Furthermore, a format of a super frame, a frame, or the like is arbitrary, and a format other than the above-described example may also be applicable. For example, a transmission time and the number of frames of a super frame are arbitrary, and not limited to the example in FIG. 5. Additionally, a communication system for a transmission signal TX is arbitrary, and a method other than the method compliant with the DSSS system may also be applicable.

Furthermore, the GNSS signal reception unit 151 may also acquire a GNSS signal received by an external unit (such as another device).

Additionally, information to be used as transmission information TM instead of a GNSS signal is not limited to NULL data and may be any information as far as the information is known to the receiver 102. Therefore, for example, the NULL generation unit 152 may supply the selection unit 153 with arbitrary information known to the receiver 102 instead of the NULL data.

Furthermore, in the above description, it has been described that: in the case where the time information is supplied (in other words, in the case where a GNSS signal can be received), the selection unit 153 selects time information as transmission information TM, and in the case where the time information is not supplied (in other words, in the case where any GNSS signal cannot be received), NULL data is selected as the transmission information TM, however; selection may also be made by a method other than this method. For example, the selection unit 153 may select, as the transmission information TM, any one of the time information and the NULL data designated by a user.

Note that the GNSS signal reception unit 151 may be able to obtain a position of the transmitter 101 on the basis of a received GNSS signal. In this case, when the GNSS signal can be received, the GNSS signal reception unit 151 obtains the position of the transmitter 101 on the basis of the GNSS signal, and when any GNSS signal cannot be received, such a fact may be notified to the selection unit 153. Then, the selection unit 153 may select, as the transmission information TM, NULL data generated by the NULL generation unit 152 in accordance with the notification.

Also, either the GNSS signal reception unit 151 or the NULL generation unit 152 may be omitted. In this case, the selection unit 153 may also be omitted. For example, the NULL generation unit 152 and the selection unit 153 may be omitted, and the GNSS signal reception unit 151 may constantly supply the CRC attachment unit 154 with time information as the transmission information TM. Also, for example, the GNSS signal reception unit 151 and the selection unit 153 may be omitted, and the NULL generation unit 152 may constantly supply the CRC attachment unit 154 with NULL data as the transmission information TM.

Additionally, it has been described above that transmission information QD is subjected to BPSK modulation, but a phase displacement amount is arbitrary, and not limited thereto. For example, QPSK modulation (four-phase shift modulation) may also be performed. In the case of QPSK modulation, the phase displacement amount is $\pi/2$, and carrier waves have four phases including 0, $\pi/2$, $\pi$, and $3\pi/2$. In this case, the Gold code generation unit 160 may generate a pseudo random number sequence that displaces the transmission information QD in four phases, and the multiplication unit 161 may multiply the transmission information QD by the pseudo random number sequence.

Attachment of a cyclic redundancy check code (CRC) for error detection to a transmission signal TX may be omitted. In this case, the CRC attachment unit 154 can be omitted.

The synchronization pattern generated by the synchronization signal generation unit 155 may include identification information of the transmitter 101 or may not include the same. Since the identification information of the transmitter 101 is included, it is possible for the receiver 102 side to grasp which transmitter 101 has transmitted the received signal. Furthermore, attachment of a synchronization pattern to a transmission signal TX may also be omitted. In this case, the synchronization signal generation unit 155 and the selection unit 156 can be omitted.

Also, the same transmission signal TX (frame) may not be transmitted a plurality of times. In this case, the frame counter 157 and the register 158 can be omitted. A synchronization pattern may not be dispersed in a transmission signal. In this case, the interleave unit 159 can be omitted. Attachment of a pseudo random number sequence to transmission information QD may be omitted as well. In this case, the Gold code generation unit 160 and the multiplication unit 161 can be omitted. The band pass filter 164 may also be omitted.

Additionally, grid matching may be performed on the basis of information other than time information included in a GNSS signal. For example, the transmitter 101 and the receiver 102 may be preliminarily set with a mutually-synchronized timing at which a transmission signal can be transmitted.

Furthermore, a transmission signal TX may be subjected to chirp modulation (CHarp Modulation). The chirp modulation is a modulation method to spread a band by changing a frequency of a carrier signal subjected to primary modulation at consecutive frequencies in accordance with a time. Influence of interference or the like caused by a partial frequency can be suppressed by thus spreading the band. Note that a transmission signal TX may be subject to frequency hopping (FH) modulation by which a frequency is changed at random.

<Configuration of Receiver>

Figure 8:
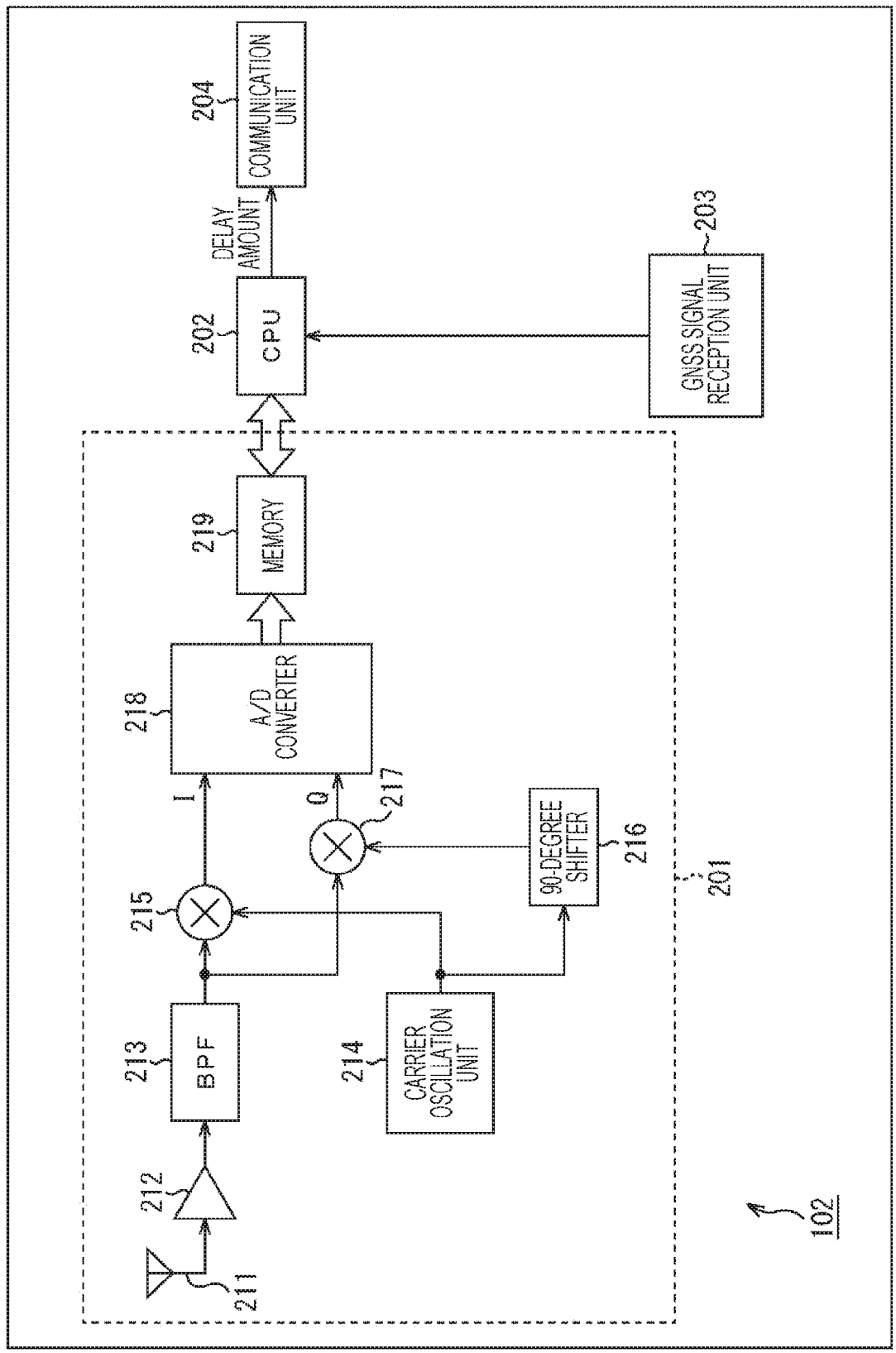
FIG. 8 is a diagram to describe an exemplary state of estimating a position of a receiver.

FIG. 8 is a block diagram illustrating exemplary main components of the receiver 102 in FIG. 1. As illustrated in FIG. 8, the receiver 102 includes a reception unit 201, a central processing unit (CPU) 202, a GNSS signal reception unit 203, and a communication unit 204.

The reception unit 201 performs processing related to reception of a radio signal. The CPU 202 executes a program and processes data, thereby performing processing related to acquisition of information included in a radio signal received by the reception unit 201. Meanwhile, it is assumed that the CPU 202 includes all of necessary components to execute various kinds of processing, such as a read only memory (ROM), a random access memory (RAM), and the like.

The GNSS signal reception unit 203 performs processing related to reception of a GNSS signal. Additionally, the GNSS signal reception unit 203 acquires time information included in a received GNSS signal, generates a reference signal synchronized with a transmission timing of the transmitter 101 on the basis of the time information thereof in a manner similar to the transmitter 101. The GNSS signal reception unit 203 supplies the CPU 202 with the reference signal.

Furthermore, the CPU 202 obtains a propagation delay amount on the basis of the radio signal received by the reception unit 201 and the reference signal supplied from the GNSS signal reception unit 203, and the propagation delay amount is a delay amount from a transmission timing at which a radio signal is transmitted to a reception timing at which the radio signal is received. The CPU 202 supplies the communication unit 204 with the obtained propagation delay amount. Additionally, the CPU 202 also supplies the communication unit 204 with information on the transmitter 101 (transmitter ID and the like), information on the receiver 102 (own identification information (receiver ID) and information on a position (receiver positional information)).

The communication unit 204 communicates with other devices via the Internet 103. For example, the communication unit 204 supplies the server 104 with the propagation delay amount supplied from the CPU 202, the information on the transmitter 101, the information on the receiver 102, and the like.

Additionally, as illustrated in FIG. 3, the reception unit 201 includes an antenna 211, a low noise amplification unit 212, a band pass filter (BPF) 213, a carrier oscillation unit 214, a multiplication unit 215, a 90-degree shifter 216, a multiplication unit 217, an A/D converter 218, and a memory 219.

The low noise amplification unit 212 receives a radio signal (transmission signal TX) via the antenna 211, amplifies the received signal, and supplies the same to the band pass filter 213.

The band pass filter 213 removes an unnecessary frequency component from the received signal and supplies the signal to the multiplication unit 215 and the multiplication unit 217.

The carrier oscillation unit 214 generates a signal having a carrier frequency of a predetermined frequency used in transmission and reception. For example, in the case of receiving a signal transmitted in the 920 MHz band, the carrier oscillation unit 214 oscillates the 920 MHz. The carrier oscillation unit 214 supplies the oscillation signal (carrier signal) to the multiplication unit 215 and the 90-degree shifter 216.

The multiplication unit 215 multiplies the received signal supplied from the band pass filter 213 by the carrier signal supplied from the carrier oscillation unit 214 to generate a baseband InPhase signal (I signal). The multiplication unit 215 supplies the A/D converter 218 with this I signal.

The 90-degree shifter 216 shifts a phase of the carrier signal supplied from the carrier oscillation unit 214 by 90 degrees. The 90-degree shifter 216 supplies the multiplication unit 217 with the carrier signal having the phase shifted.

The multiplication unit 217 multiplies the received signal supplied from the band pass filter 213 by the carrier signal having the phase shifted by 90 degrees and supplied from the 90-degree shifter 216, and generates a baseband Quadrature signal (Q signal). The multiplication unit 215 supplies the A/D converter 218 with this Q signal.

The A/D converter 218 applies A/D conversion to the supplied I signal and Q signal respectively, and supplies digital data thereof to the memory 219 for storage. A conversion rate of the A/D converter 218 is required to exceed a chip rate used in transmission. For example, in the case where transmission is performed at a chip rate 200 K/s with Δ=5 µs, the A/D converter 218 needs to perform A/D conversion at a conversion rate of at least 200 KHz or more.

The memory 219 has a predetermined storage medium, acquires the digital data of the I signal and Q signal supplied from the A/D converter 218, and stores the same in the storage medium. The storage medium may be anything, for example, a semiconductor memory, a magnetic recording medium such as a hard disk, or any other storage medium. In the case where A/D conversion is performed for 30 seconds in the A/D converter 218 with 8-bit accuracy at a double conversion rate (400 KHz), the memory 219 accumulates the digital data of the I and Q signals of 24 megabytes (24 Mbytes).

The CPU 202 reads the digital data of the I signal and Q signal accumulated in the memory 219, obtains a correlation with the reference signal synchronized with a transmission timing, and obtains a propagation delay amount from the correlation.

<Functional Block in CPU>

Figure 9:
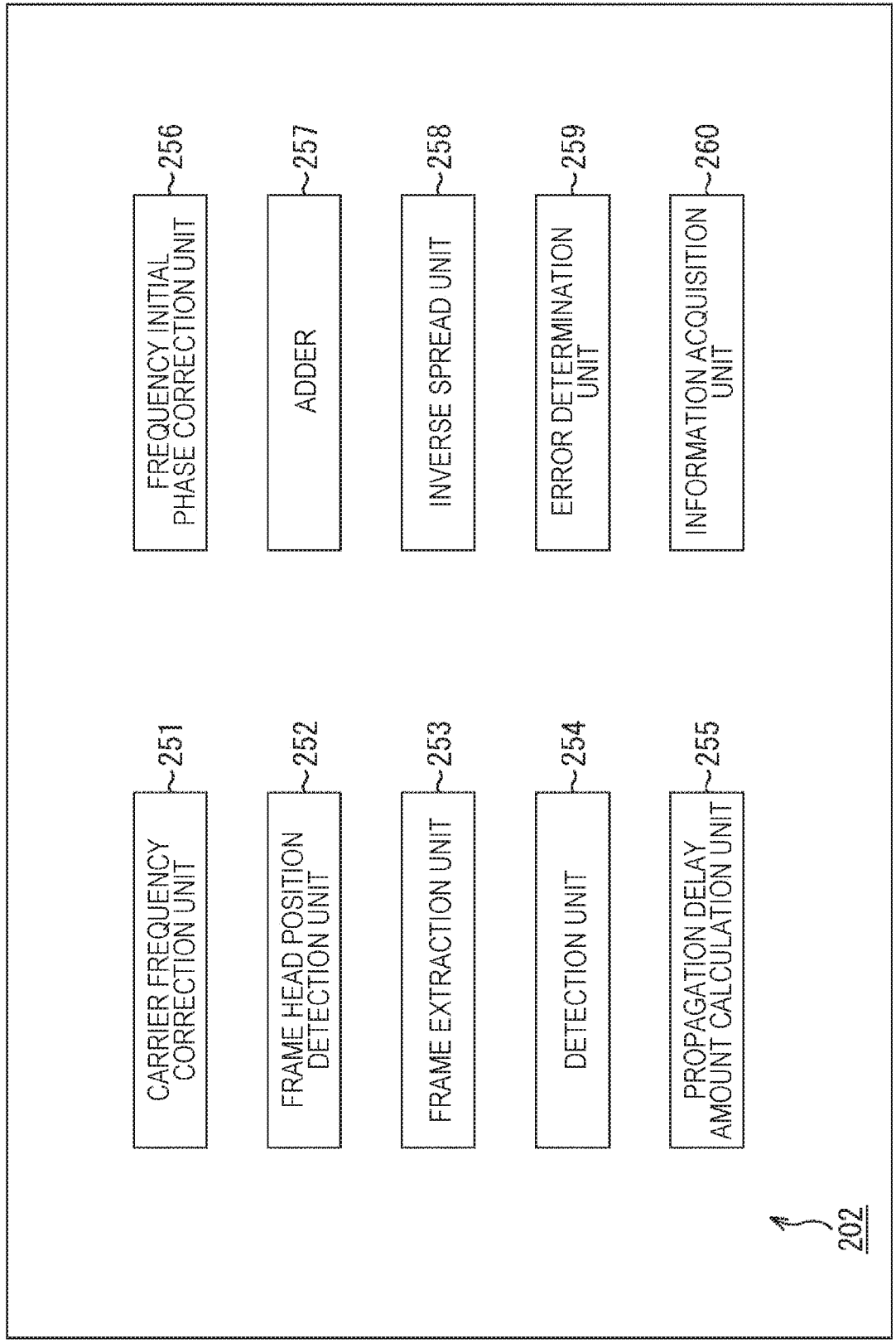
FIG. 9 is a functional block diagram illustrating exemplary main functions implemented by a CPU.

FIG. 9 is a functional block diagram illustrating exemplary main functions implemented by the CPU 202. As illustrated in FIG. 9, the CPU 202 includes a carrier frequency correction unit 251, a frame head position detection unit 252, a frame extraction unit 253, a detection unit 254, a propagation delay amount calculation unit 255, a frequency initial phase correction unit 256, an adder 257, an inverse spread unit 258, an error determination unit 259, and an information acquisition unit 260. These functions are implemented by the CPU 202 executing a program and processing data.

The carrier frequency correction unit 251 performs processing related to carrier frequency correction. The frame head position detection unit 252 performs processing related to detection of a frame head position. The frame extraction unit 253 performs processing related to frame extraction. The detection unit 254 performs processing related to detection of various kinds of parameters. The propagation delay amount calculation unit 255 performs processing related to calculation of a propagation delay amount. The frequency initial phase correction unit 256 performs processing related to correction of a frequency and an initial phase. The adder 257 performs processing related to data addition. The inverse spread unit 258 performs processing related to inverse spread. The error determination unit 259 performs processing related to error determination. The information acquisition unit 260 performs processing related to acquisition of information on the transmitter 101 and information on the receiver 102.

<Flow of Reception Processing>

Figure 10:
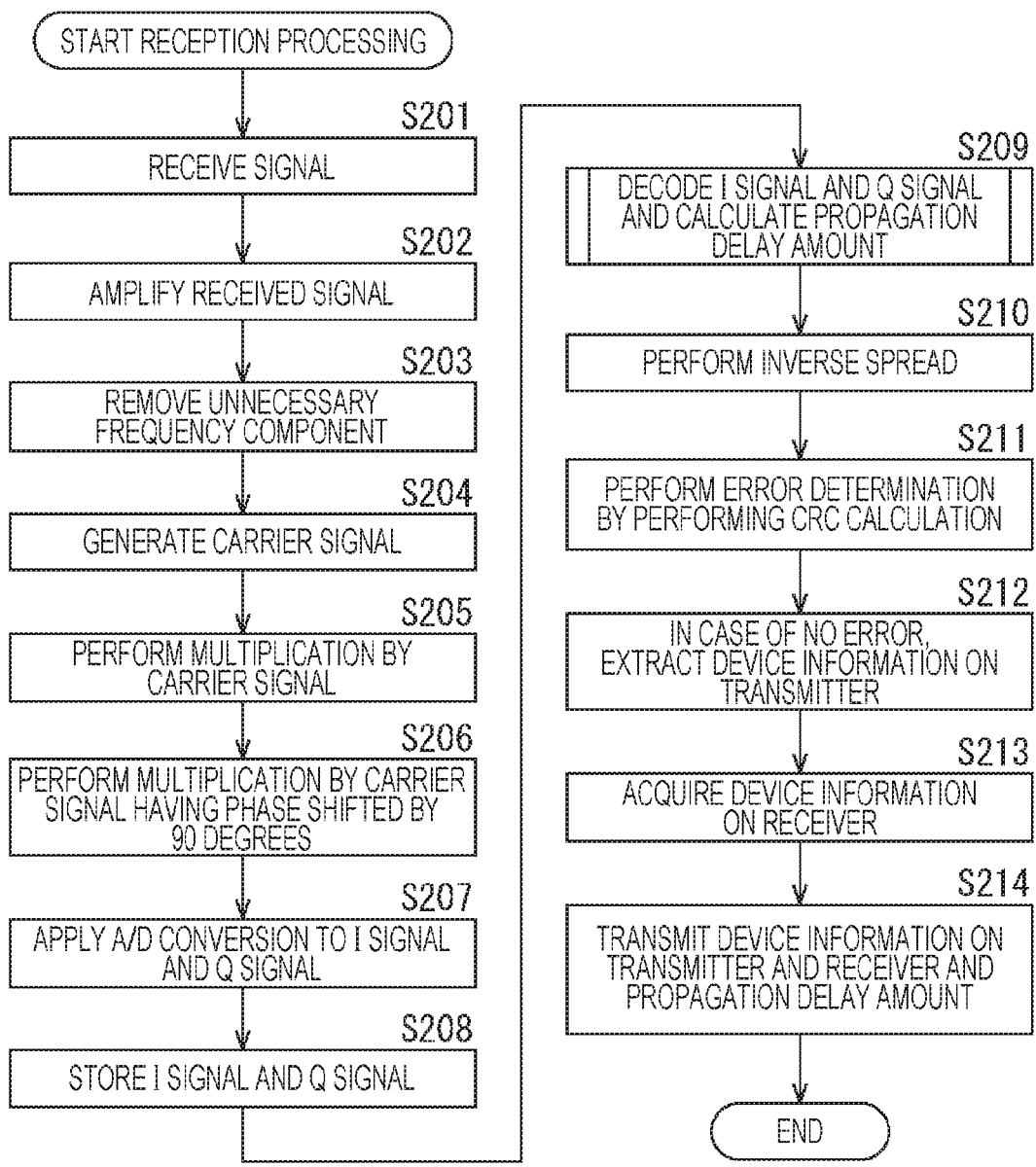
FIG. 10 is a flowchart illustrating an exemplary flow of reception processing.

Next, an exemplary flow of reception processing executed in the above-described receiver 102 will be described with reference to a flowchart in FIG. 10.

When the reception processing is started, the low noise amplification unit 212 receives a radio signal (transmission signal TX) transmitted from the transmitter 101 via the antenna 211 in step S201. Note that, in the case where the radio signal cannot be received, the reception processing is finished. In other words, substantially, the reception processing is executed only in the case where the transmitter 101 is located within a range capable performing radio communication.

In step S202, the low noise amplification unit 212 amplifies a received signal that is the radio signal received in step S201.

In step S203, the band pass filter 213 removes an unnecessary frequency component from the received signal amplified by the low noise amplification unit 212.

In step S204, the carrier oscillation unit 214 oscillates a predetermined frequency and generates a carrier signal.

In step S205, the multiplication unit 215 multiplies the received signal by the carrier signal, thereby generating an I signal.

In step S206, the 90-degree shifter 216 shifts a phase of the carrier signal by 90 degrees. Then, the multiplication unit 217 multiplies the received signal by the carrier signal having the phase shifted by 90 degrees, thereby generating a Q signal.

In step S207, the A/D converter 218 applies A/D conversion to the I signal generated by the multiplication unit 215 and the Q signal generated by the multiplication unit 217 respectively.

In step S208, the memory 219 stores digital data of the I signal and digital data of the Q signal respectively generated by the A/D converter 218.

In step S209, the CPU 202 reads the digital data of the I signal and the digital data of the Q signal from the memory 219, decodes the same, and calculates a propagation delay amount of the transmission signal TX.

In step S210, the inverse spread unit 258 multiplies a Gold code by frame data obtained from the decoding, and then integrates the data, thereby performing decode processing by inverse spread and restoring the transmission information TM.

In step S211, the error determination unit 259 performs error determination by performing CRC calculation.

In step S212, when no error is detected by the error determination unit 259, the information acquisition unit 260 extracts and acquires, from the frame data, information on the transmitter 101 (such as transmitter ID) that is a transmission source of the transmission signal TX.

In step S213, the information acquisition unit 260 acquires information on the receiver 102 (receiver ID, receiver positional information, and the like) from a storage unit (e.g., a ROM and the included in the CPU 202) that stores the information. The information on the receiver 102 may also be stored in an arbitrary location (storage unit) of the receiver 102. Additionally, for example, the information on the receiver 102 may be managed outside the receiver 102, such as the server 104. In this case, the information acquisition unit 260 acquires the information from outside via the communication unit 204.

In step S214, the communication unit 204 transmits, to the server 104: the information on the transmitter 101 and information on the receiver 102 acquired by the information acquisition unit 260; and the propagation delay amount of the transmission signal TX calculated by the propagation delay amount calculation unit 255.

When the above-described information is transmitted, the reception processing ends. Note that the receiver 102 performs the reception processing as described above for all of frames transmitted from the transmitter 101.

<Flow of Propagation Delay Amount Calculation Processing>

Figure 11:
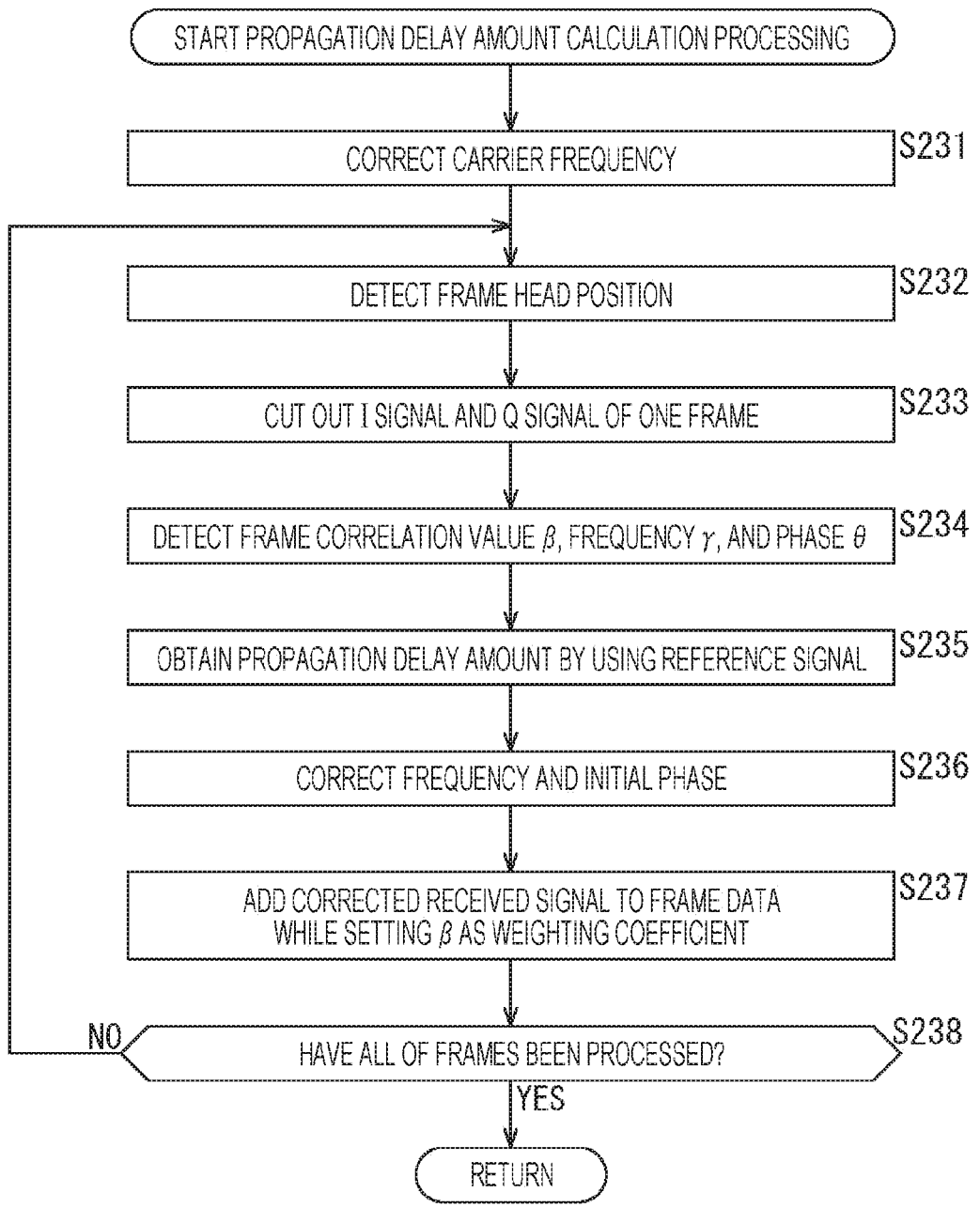
FIG. 11 is a flowchart illustrating an exemplary flow of propagation delay amount calculation processing.

An exemplary flow of propagation delay amount calculation processing executed in step S209 of FIG. 10 will be described with reference to a flowchart in FIG. 11.

When the propagation delay amount calculation processing is started, the carrier frequency correction unit 251 corrects a carrier frequency in step S231. An oscillation frequency of the carrier oscillation unit 214 may be a frequency slightly deviated due to an environment temperature. Therefore, the carrier frequency correction unit 251 measures the environment temperature, estimates a slight deviation of the carrier frequency, and corrects the same. Consequently, frame data can be obtained with higher accuracy.

In step S232, the frame head position detection unit 252 detects a frame head position.

In step S233, the frame extraction unit 253 cuts out received signals (I signal and Q signal) of one frame from the frame head position detected by the frame head position detection unit 252. Note that a serial number of the detected frame is defined as n.

In step S234, the detection unit 254 calculates a correlation value between the I signal and Q signal cut out by the frame extraction unit 253 and a synchronization signal (SYNC), and defines the correlation value as β(n). Furthermore, the detection unit 254 obtains a frequency correction value γ(n) and an initial phase θ(n) respectively assuming that the correlation value β(n) is a maximum value.

In step S235, the GNSS signal reception unit 203 generates a pseudo random number sequence PN in a manner similar to the case of the transmitter 101 while time information included in the GNSS signal or NULL data is set as the transmission information TM. Since the transmission information TM is information known to the receiver 102, all of the data of one frame is formed of information known to the receiver 102. Therefore, the GNSS signal reception unit 203 can generate a pseudo random number sequence PN in a manner similar to the case of the transmitter 101. The GNSS signal reception unit 203 generates a reference signal by synchronizing the pseudo random number sequence PN with a transmission timing of the transmission signal TX in the transmitter 101. Since the transmission timing is a timing known to the receiver 102, the GNSS signal reception unit 203 can synchronize the pseudo random number sequence PN with the transmission timing.

In other words, this reference signal is a signal having no propagation delay. The propagation delay amount calculation unit 255 obtains a correlation between the received signals (the I signal and Q signal cut out by the frame extraction unit 253) and the reference signal, and obtains a propagation delay amount on the basis of the correlation.

In other words, the propagation delay amount calculation unit 255 calculates, for a predetermined signal received as a radio signal, a propagation delay amount on the basis of the correlation between the signal and the reference signal synchronized with the transmission timing, in which the propagation delay amount is a delay amount from a transmission timing at which the signal is transmitted as the radio signal to a reception timing at which the signal is received.

Figure 12:
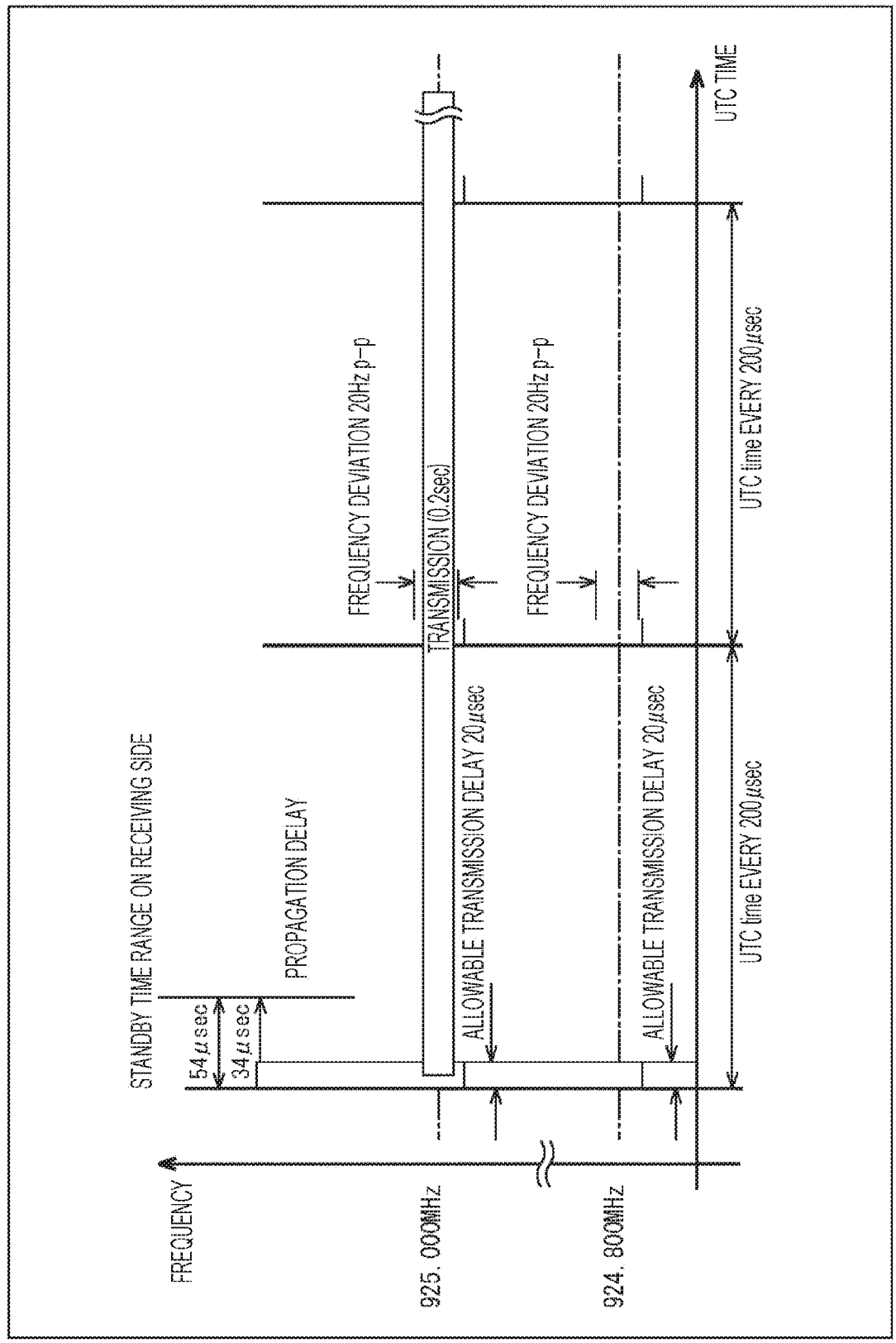
FIG. 12 is a diagram to describe an exemplary state of signal receiving.

Meanwhile, as illustrated in FIG. 12, a predetermined time from the transmittable timing is set in the transmitter 101 as an allowable transmission delay time range, and a radio signal may be allowed to be transmitted within this time range. In an example of FIG. 12, 20 μsec is set as the allowable transmission delay time range. It is ideal that a transmission signal is transmitted just in a transmittable timing known to the receiver 102, but actually, such transmission is difficult. To achieve such ideal transmission, highly-advanced timing control is required, and the cost may be increased.

Therefore, by thus providing the allowable transmission delay time range, timing control performance required in the transmitter 101 can be suppressed and the cost increase can be suppressed.

Meanwhile, in the case of thus providing the allowable transmission delay time range, a propagation delay amount may be a delay amount from a time when the allowable transmission delay time range has passed from the transmittable timing known to the receiver 102. For example, as illustrated in the example of FIG. 12, a time range in which the receiver 102 stands by for a radio signal is set to 54 μsec from the transmittable timing known to the receiver 102. In this case, assuming that a radio signal is received after 54 μsec from the transmittable timing known to the receiver 102 (assuming that the reception timing corresponds to a time when 54 μsec has passed from the transmittable timing known to the receiver 102), a propagation delay amount is to be 34 μsec.

Meanwhile, the allowable transmission delay time range and a length of the time range in which the receiver 102 stands by for a radio signal are arbitrary, and may be other than the above-described example.

Figure 13:
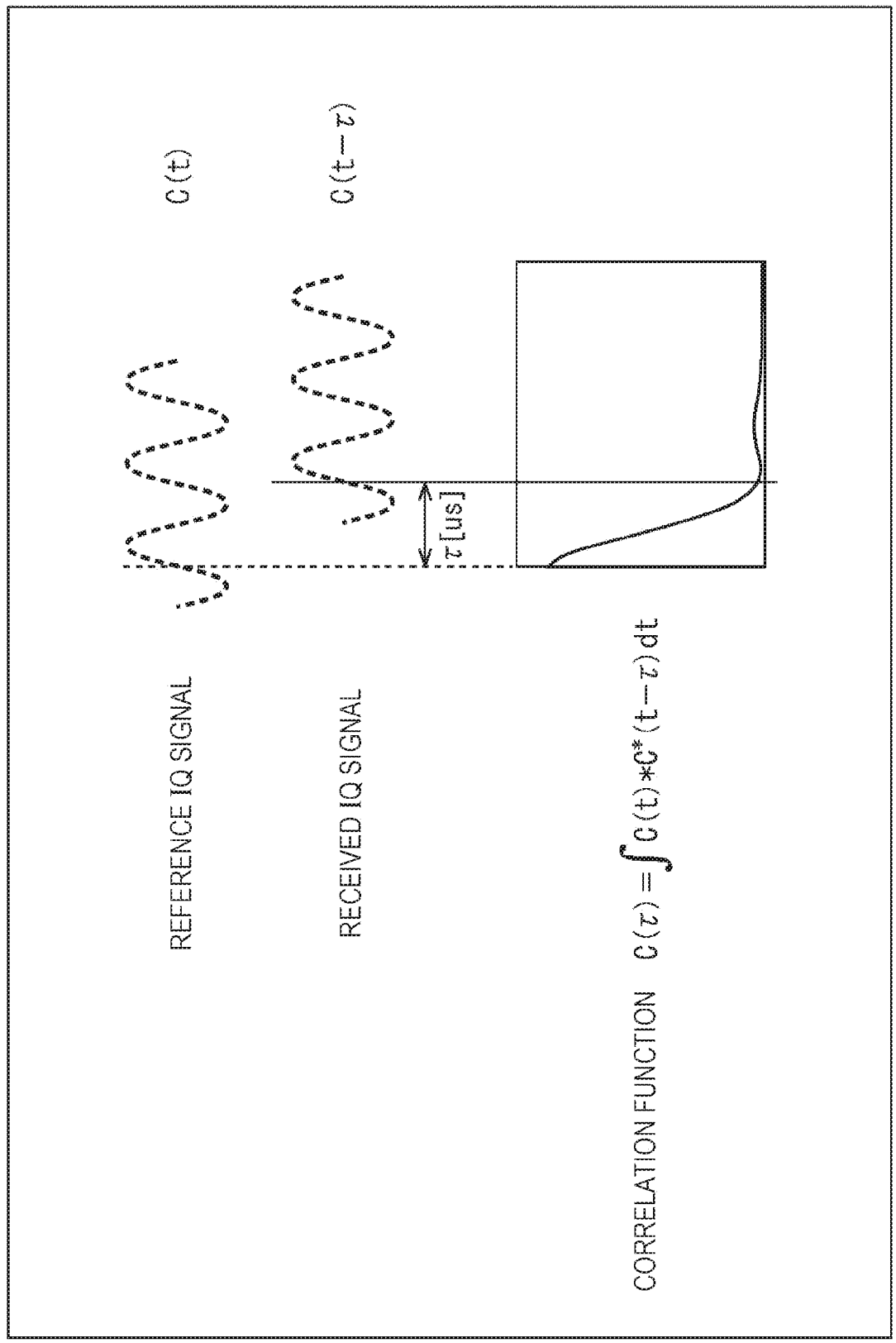
FIG. 13 is a diagram to describe an exemplary state of propagation delay calculation.

When a reference signal (reference IQ signal) is defined as C(t) and a received signal (received IQ signal) is defined as C(t−τ) as illustrated in FIG. 13, the propagation delay amount calculation unit 255 obtains a correlation therebetween by multiplying these functions as shown in Formula (1) below and integrating multiplication results in a time direction.

[Mathematical Formula 1]

$$C(\tau) = \int C(t) * C^*(t-\tau) dt \quad (1)$$

The correlation function C(τ) is, for example, as illustrated in a graph illustrated in FIG. 13. A time (τ[μsec]) from a peak value to a lower limit value is to be a propagation delay amount.

In step S236, the frequency initial phase correction unit 256 performs correction for a frequency and correction for an initial phase of a received signal by using the frequency correction value γ(n) and the initial phase θ(n).

In step S237, the adder 257 adds the received signal corrected by the frequency initial phase correction unit 256 to frame data. At this point, the adder 257 adds a weight to the received signal while setting the correlation value β(n) as a weighting coefficient.

In step S238, the frame head position detection unit 252 determines whether all of the frames have been processed. In the case of determining that any unprocessed frame exists, the processing returns to step S232, and the processing subsequent thereto is repeated. For each frame, the processing from step S232 to step S238 is executed, and in the case of determining that all of the frames have been processed in step S238, the propagation delay amount calculation processing is finished and the processing returns to FIG. 10.

As described above, the receiver 102 can obtain a propagation delay amount of a radio signal by executing the respective processing. Consequently, a distance between a position where a signal is transmitted and a position where the signal is received can be obtained with higher accuracy.

<Others>

Note that a frequency band, a communication method, a modulation method, and the like used to transmit a transmission signal TX are arbitrary in a manner similar to the above case described for a transmitter 101.

Additionally, a transmittable timing for a radio signal is also similar to the above case described for the transmitter 101. In other words, there may be a plurality of transmittable timings known to a receiver 102. Also, the plurality of timings may be timings regularly or irregularly repeated on the time axis.

In the case where there is a plurality of transmittable timings as described above, a receiver 102 may estimate at which timing among these timings a radio signal is transmitted. As described later, a volume of a propagation delay amount is proportional to a length of a distance between a position where a radio signal is transmitted (namely, position of a transmitter 101) and a position where the radio signal is received (namely, position of a receiver 102). Since the communicable range of a receiver 102 is finite, the volume of the propagation delay amount is also finite. In the case of exceeding an upper limit of such a propagation delay amount, it is clear that there is an error in a transmission timing used to calculate the propagation delay amount.

Therefore, a receiver 102 may obtain a correlation between each of reference signals at the plurality of transmittable timings and a received signal, obtain a propagation delay amount, and estimate at which transmittable timing the radio signal is transmitted on the basis of the propagation delay amount.

Furthermore, in the case where a value of a calculated propagation delay amount is invalid, a receiver 102 may discard the propagation delay amount and not transmit the propagation delay amount to the server 104.

Note that the upper limit of the propagation delay amount may be limited by a range other than the communicable range of the receiver 102. For example, as illustrated in the example of FIG. 12, in the case of setting a standby time range on the receiving side, the upper limit of the propagation delay amount may be limited by this time range.

Furthermore, when the propagation delay amount calculation unit 255 calculates a propagation delay amount, correlation calculation may be repeatedly performed a plurality of times and results thereof may be integrated. Consequently, a peak value of the correlation value can be more increased, and measurement accuracy for the propagation delay amount can be improved.

<Configuration of Server>

Figure 14:
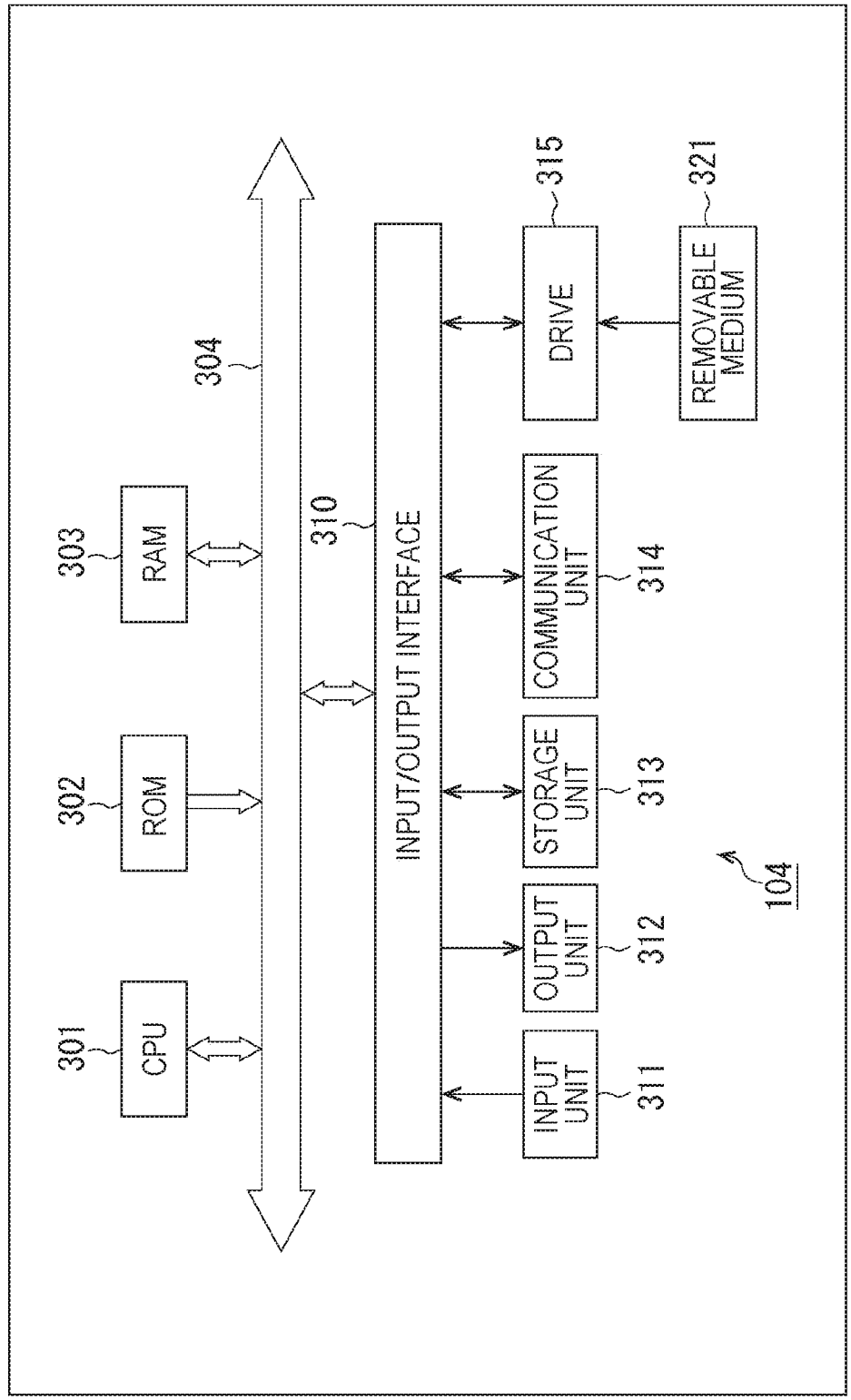
FIG. 14 is a block diagram illustrating exemplary main components of a server.

FIG. 14 is a block diagram illustrating exemplary main components of the server 104 in FIG. 1. As illustrated in FIG. 14, the server 104 includes a CPU 301, a ROM 302, a RAM 303, a bus 304, an input/output interface 310, an input unit 311, an output unit 312, a storage unit 313, a communication unit 314, and a drive 315.

The CPU 301, ROM 302, and RAM 303 are mutually connected via the bus 304. The input/output interface 310 is also connected to the bus 304. The input unit 311, output unit 312, storage unit 313, communication unit 314, and drive 315 are connected to the input/output interface 310.

The input unit 311 includes, for example, a keyboard, a mouse, a microphone, a touch panel, an input terminal, and the like. The output unit 312 includes, for example, a display, a speaker, an output terminal, and the like. The storage unit 313 includes, for example, a hard disk, a RAM disk, a nonvolatile memory, and the like. The communication unit 314 includes, for example, a network interface. The drive 315 drives a removable medium 321 such as a magnetic disk, an optical disk, a magneto-optical disk, or a semiconductor memory.

In the server 104 having the above-described configuration, for example, the CPU 301 loads a program stored in the storage unit 313 in the RAM 303 via the input/output interface 310 and the bus 304, and executes the program. The RAM 303 also suitably stores data and the like necessary for the CPU 301 to execute various kinds of processing.

The program to be executed by the server 104 (CPU 301) can be applied by being recorded in, for example, the removable medium 321 as a package medium. In this case, the program can be installed in the storage unit 313 via the input/output interface 310 by attaching the removable medium 321 to the drive 315.

Also, this program can be provided via a wired or radio transmission medium such as a local area network, the Internet, or digital satellite broadcasting. In this case, the program can be received by the communication unit 314 and installed in the storage unit 313.

Besides, the program can be preliminarily installed in the ROM 302 or the storage unit 313.

<Functional Block in CPU>

Figure 15:
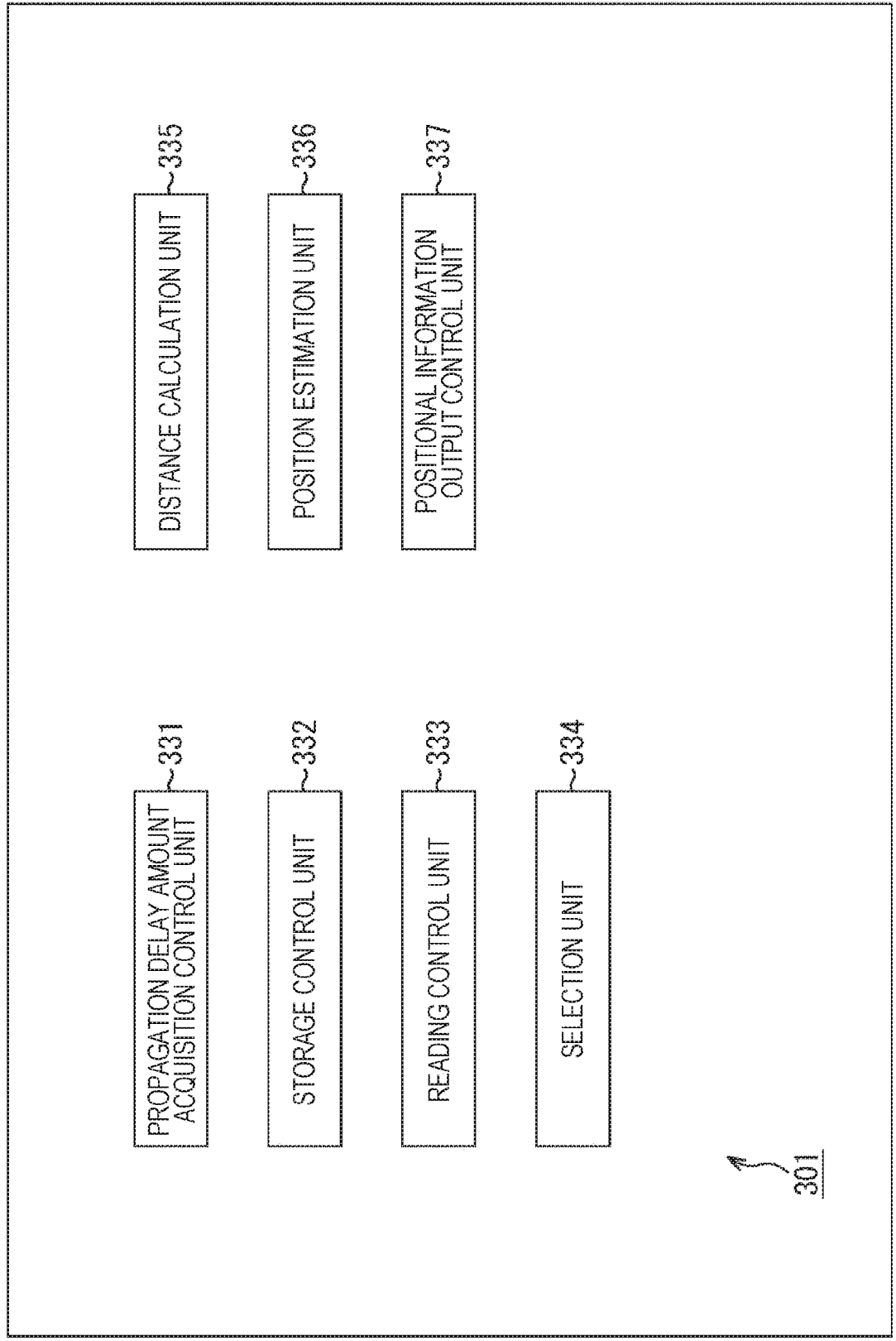
FIG. 15 is a functional block diagram illustrating exemplary main functions implemented by a CPU.

FIG. 15 is a functional block diagram illustrating exemplary main components of functions implemented by the CPU 301. As illustrated in FIG. 15, the CPU 301 includes a propagation delay amount acquisition control unit 331, a storage control unit 332, a reading control unit 333, a selection unit 334, a distance calculation unit 335, a position estimation unit 336, and a positional information output control unit 337. These functions are implemented by the CPU 301 executing a program or processing data.

The propagation delay amount acquisition control unit 331 performs processing related to control for propagation delay amount acquisition. The storage control unit 332 performs processing related to storage control. The reading control unit 333 performs processing related to control for reading a stored propagation delay amount. The selection unit 334 performs processing related to selection of a propagation delay amount. The distance calculation unit 335 performs processing related to distance calculation. The position estimation unit 336 performs processing related to position estimation. The positional information output control unit 337 performs processing related to control for positional information output.

<Flow of Position Estimation Processing>

Figure 16:
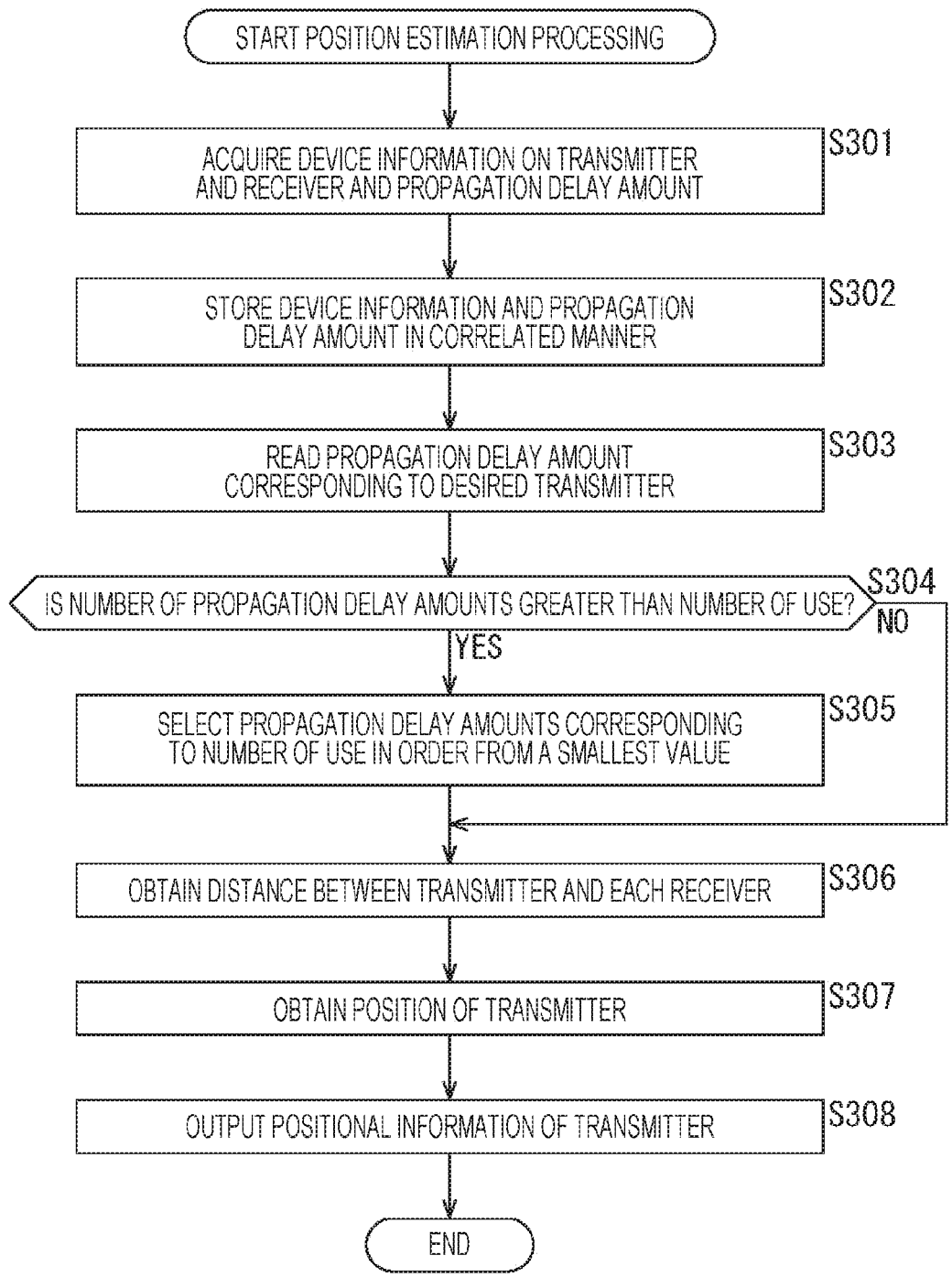
FIG. 16 is a flowchart illustrating an exemplary flow of position estimation processing.

Next, an exemplary flow of position estimation processing executed in the above-described server 104 will be described with reference to a flowchart in FIG. 16.

In step S301, the propagation delay amount acquisition control unit 331 controls the communication unit 314 to acquire information on a transmitter 101, information on a receiver 102, and a propagation delay amount which are supplied from the receiver 102.

As described above, the information on a transmitter 101 includes, for example, identification information (transmitter ID) and the like of the transmitter 101 that transmits a radio signal. Additionally, the information on a receiver 102 includes, for example: identification information (receiver ID) of the receiver 102 that receives the radio signal (receiver 102 that supplies the information); positional information of the receiver 102; and the like. A propagation delay amount is acquired under the control of the propagation delay amount acquisition control unit 331, and also information supplied together with the propagation delay amount is acquired. Meanwhile, in the case where a transmitter 101 that transmits a radio signal is obvious (for example, in the case where there is only one transmitter 101), transmission and receipt of the information on the transmitter 101 may be omitted.

In step S302, the storage control unit 332 causes the storage unit 313 to store the information acquired by the communication unit 314 (information on the transmitter 101, information on the receiver 102, and propagation delay amount) in a manner correlated to each other.

The above processing is performed for each propagation delay amount supplied from the receiver 102. For example, in the case where a radio signal transmitted from one transmitter 101 is received by a plurality of receivers 102, the server 104 performs the above-described processing for a propagation delay amount supplied from each of the plurality of receivers 102.

In step S303, a propagation delay amount corresponding to a desired transmitter 101, for which a position is to be estimated, is read from the storage unit 313 under the control of the reading control unit 333.

In step S304, the selection unit 334 determines whether the number of the read propagation delay amounts is greater than the number thereof to be used to estimate a position of the transmitter 101 (number of use). In the case where the number of read propagation delay amounts is greater than the number of use, the selection unit 334 selects, in the order from a smallest value, propagation delay amounts corresponding to the number of use from among the read propagation delay amounts in step S305.

The position of the transmitter 101 can be estimated from positions from three or more receivers 102. In other words, when at least three propagation delay amounts are used, the position of the transmitter 101 can be estimated. For example, assuming that the position of the transmitter 101 is estimated by using the three propagation delay amounts, in the case where there are four or more propagation delay amounts, selection has to be made from among the propagation delay amounts because some of them are unnecessary. Therefore, it is important to select a propagation delay amount on the basis of which a position can be estimated with higher accuracy.

Generally, the smaller the propagation delay amount is, the smaller an error is. Therefore, the position of the transmitter 101 can be estimated with higher accuracy by estimating the position of the transmitter 101 by using a propagation delay amount having a smaller value.

Upon selection of the propagation delay amounts, the processing proceeds to step S306. Additionally, in the case of determining that the number of propagation delay amounts is not greater than the number of use in step S304, the processing proceeds to step S306.

In step S306, the distance calculation unit 335 calculates a distance between a position where a radio signal is transmitted and a position where the radio signal is received by using a propagation delay amount. In other words, the distance calculation unit 335 calculates the distance between the transmitter 101 transmitting the radio signal and each receiver 102 receiving the radio signal.

A specific method to calculate a distance from a propagation delay amount is arbitrary. Basically, since a propagation delay amount is proportional to a propagation distance, the distance calculation unit 335 is to obtain the distance on the basis of this proportional relation. For example, a conversion function may be prepared in advance, and a propagation delay amount may be converted to a distance by calculation, or conversion may be performed on the basis of a correspondence table between representative values of a propagation delay amount and a distance. In this case, an intermediate value (value between representative values) may be obtained by interpolation processing or the like.

As described above, since a propagation delay amount is obtained on the basis of a correlation between a received signal (synchronized with a reception timing) and a reference signal (synchronized with a transmission timing), a maximum value of an error of the propagation delay amount is equivalent to one wavelength of the signal. Therefore, a maximum value of an error in distance calculation by the distance calculation unit 335 is also a length equivalent to one wavelength of the signal. For example, in the case where a frequency of the signal is 5 MHz, a maximum error of a distance is 60 m.

Thus, accuracy of distance calculation can be improved by calculating a distance between a position where a signal is transmitted and a position where the signal is received on the basis of a propagation delay amount.

In step S307, the position estimation unit 336 obtains the position of the transmitter 101 by a three-point position measurement system or the like on the basis of: the distance between the transmitter 101 and each receiver 102 calculated by the distance calculation unit 335; and positional information of each receiver 102.

Figure 17:
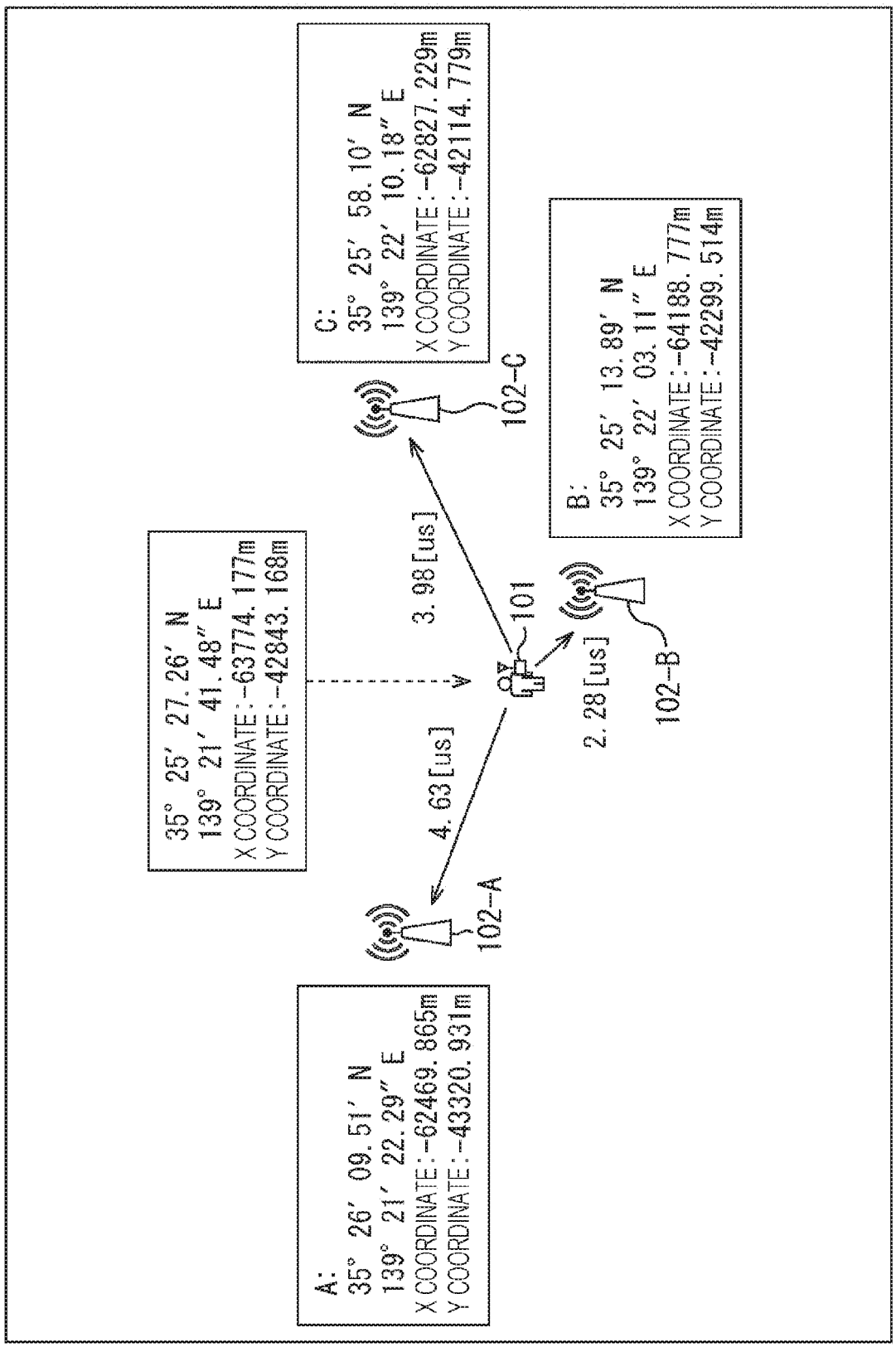
FIG. 17 is a diagram to describe an exemplary state of position estimation.

For example, as illustrated in an example of FIG. 17, a position (coordinates) of the transmitter 101 that transmits a signal is obtained by: propagation delay amounts of receivers 102-A to 102-C each receiving the signal; and positional information (coordinate information) of the receivers 102-A to 102-C.

Thus, accuracy of position estimation can be improved by estimating the position of the transmitter 101 by using a distance between the transmitter 101 and a receiver 102 obtained from a propagation delay amount.

However, a position of a transmitter 101 may not be fixed at one place as a result of position estimation by the three-point position measurement system due to a fact that the above-mentioned information includes an error or the like, for example. In such a case, the position estimation unit 336 may perform correction processing or the like so as to identify the position of the transmitter 101 at one place. Furthermore, an error range may be included in positional information of the transmitter 101. Additionally, an evaluation value to evaluate accuracy of position estimation may be calculated from the error range, and the evaluation value may be included in the positional information of the transmitter 101.

Note that a method of position estimation is arbitrary, and a method other than the three-point position measurement system may also be used. For example, accuracy of position estimation may be improved by using four or more of distances and positional information of receivers 102. In other words, the number of propagation delay amounts to be used may be arbitrary as far as the number is three or more.

In step S308, the positional information output control unit 337 controls the output unit 312, storage unit 313, communication unit 314, or drive 315 to output information indicating the position of the transmitter 101 (positional information) obtained by the position estimation unit 336.

This positional information may be output by an arbitrary method. For example, the positional information of the transmitter 101 may be displayed on a monitor of the output unit 312 as image information, may also be output as sound information from the speaker or the like of the output unit 312, or may also be transmitted to another device from an output terminal of the output unit 312. Additionally, for example, the positional information of the transmitter 101 may be stored in the storage unit 313. Also, for example, the positional information of the transmitter 101 may be supplied to another device via the communication unit 314. Furthermore, for example, the positional information of the transmitter 101 may be written in the removable medium 321 via the drive 315.

Upon completion of the above processing, the position estimation processing ends.

The server 104 can more accurately obtain a distance between a position where a signal is transmitted and a position where the signal is received by executing the position estimation processing as described above. Additionally, consequently, a position where the signal is transmitted can be more accurately estimated.

Meanwhile, as described above, in the case of the signal transmitting/receiving system 100, when a GNSS signal cannot be received, a transmission signal can be generated by using NULL data, and therefore, even in such a case, it is possible to suppress degradation of accuracy in calculating a propagation delay amount of a signal from a transmitter 101 to a receiver 102, calculating a distance from the transmitter 101 to the receiver 102, and in estimating a position of the transmitter 101.

<Others>

Note that a part of the processing performed by the server 104 may be performed by another device such as a receiver 102, for example. For example, a distance from a transmitter 101 to a receiver 102 may be calculated in the receiver 102. In this case, the receiver 102 may supply the server 104 with information indicating a calculated distance to the transmitter 101 instead of a propagation delay amount.

Furthermore, for example, position estimation for the transmitter 101 may be performed in any one of the receivers 102. In this case, the receiver 102 may acquire necessary information such as a propagation delay amount from another receiver 102.

In contrast, a propagation delay amount corresponding to each receiver 102 may also be obtained in the server 104.

<Application Examples>

The above-described signal transmitting/receiving system 100 can be applied to an arbitrary system.

Figure 18:
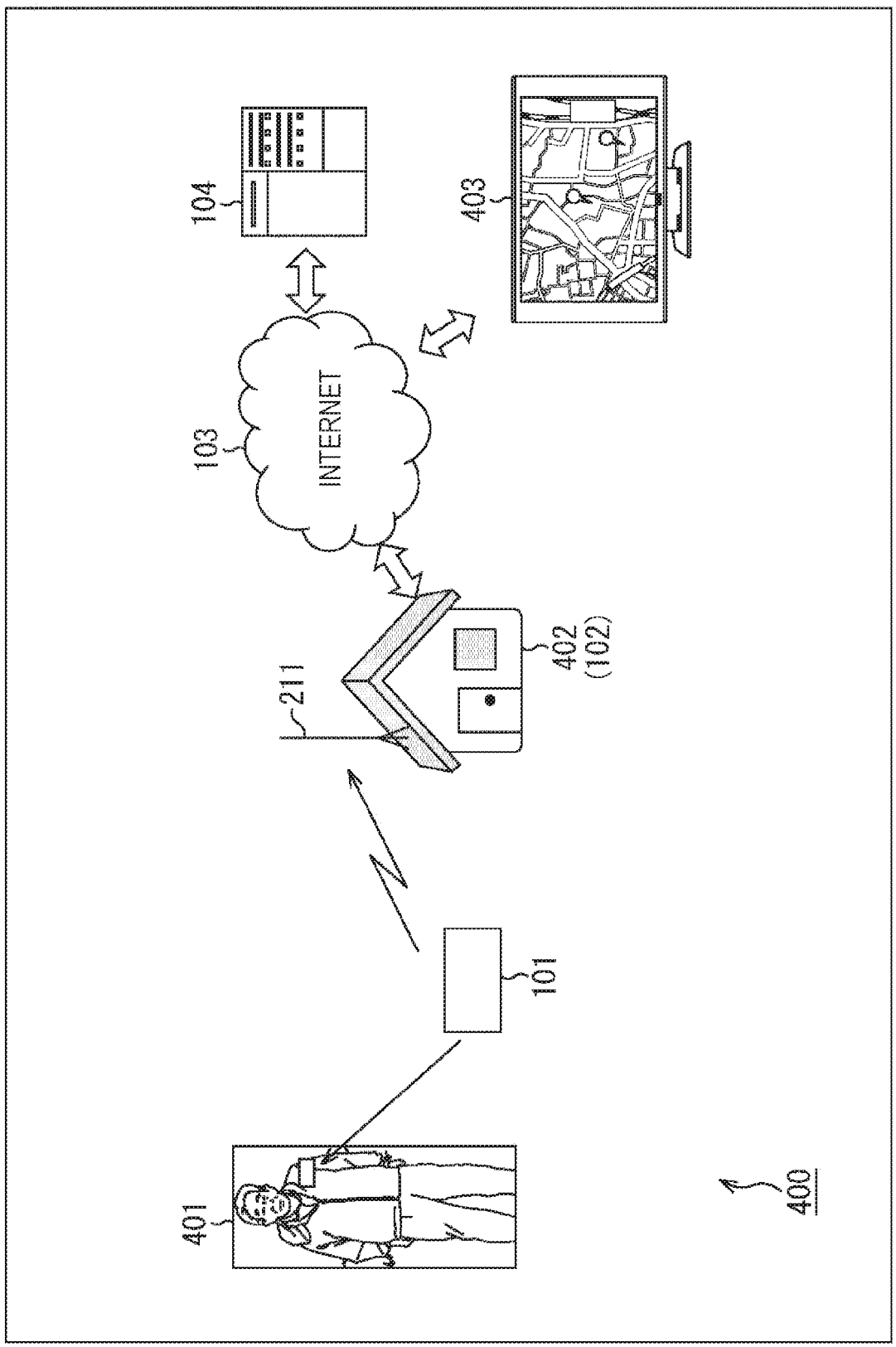
FIG. 18 is a diagram to describe an example in which the present technology is applied to a user position monitoring system.

For example, as illustrated in FIG. 18, the above-described signal transmitting/receiving system 100 may be applied to a user position monitoring system 400 adapted to monitor a position of a user such as an elderly person. In the exemplary case in FIG. 18, a transmitter 101 is carried by a user 401, and receivers 102 are provided at a plurality of places in a house 402 or the like. Similar to the case of the signal transmitting/receiving system 100, a plurality of receivers 102 receives radio signals transmitted by grid transmission by the transmitter 101 at a known timing, and propagation delay amounts of the respective signals are obtained. The server 104 obtains a distance between the transmitter 101 and each of the receivers 102 on the basis of the respective propagation delay amounts. Furthermore, the server 104 estimates a position of the transmitter 101 (user 401) on the basis of the distance to the transmitter 101 from each of the plurality of receivers 102. The server 104 displays the estimated position on a monitor 403 or the like, for example, as image information (in a manner reflected on map information, for example).

Consequently, the user position monitoring system 400 can improve estimation accuracy for the position of the user 401 in a manner similar to the case of the signal transmitting/receiving system 100.

Figure 19:
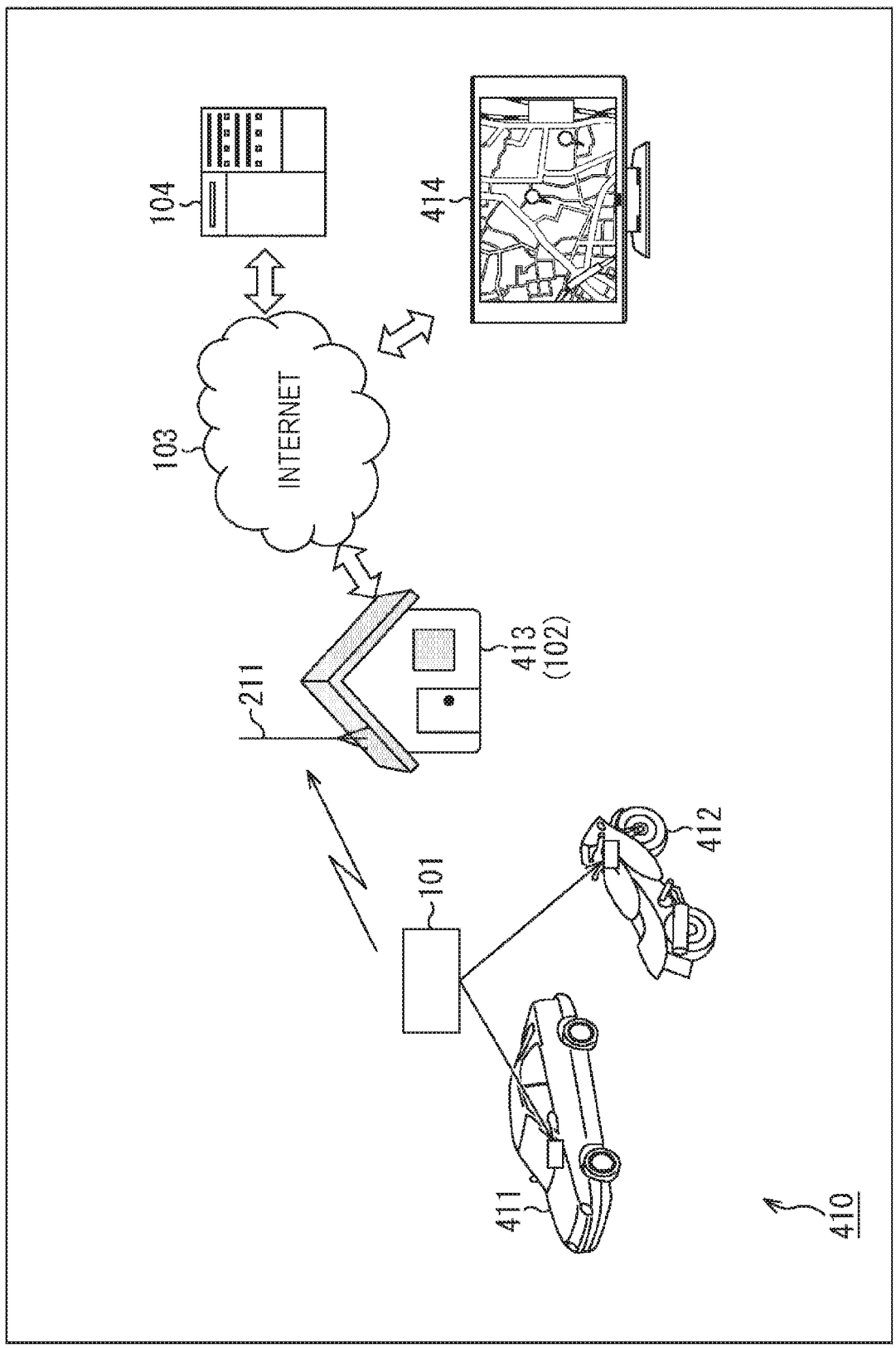
FIG. 19 is a diagram to describe an example in which the present technology is applied to an anti-theft system.

Additionally, like an example illustrated in FIG. 19, the above-described signal transmitting/receiving system 100 may be applied to an anti-theft system 410 by installing a transmitter 101 in an automobile 411 or a motorcycle 412. Similar to the case of the user position monitoring system 400 described above, receivers 102 may be provided at a plurality of places in a house 413 or the like. Furthermore, the server 104 may display an estimated position of the transmitter 101 (automobile 411 or motorcycle 412), for example, as image information on a monitor 414 or the like (in a manner reflected on map information, for example).

Consequently, the anti-theft system 410 can improve estimation accuracy for the position of the automobile 411 or the motorcycle 412 in a manner similar to the case of the signal transmitting/receiving system 100.

Figure 20B:
FIGS. 20A and 20B are diagrams to describe an example in which the present technology is applied to a system using an unmanned aircraft.
Figure 20A:
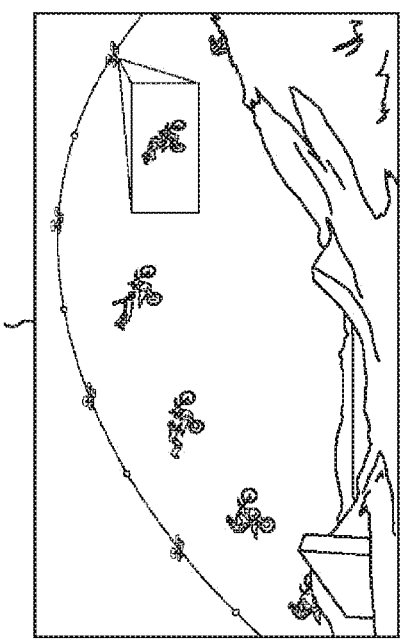

Furthermore, the transmitter 101 itself may have a moving function. For example, as illustrated in FIG. 20A, an unmanned aircraft 421 capable of performing autonomous flight or capable of flying by being remotely operated by a user may have a configuration of a transmitter 101. For example, the unmanned aircraft 421 has an imaging function and captures an image of a subject as illustrated in FIG. 20B, and can supply the image to another device such as a server 104.

In this system, a position and a posture of the unmanned aircraft 421 may be controlled by estimating a position of the unmanned aircraft 421 by using the estimated position in a manner similar to the case of the signal transmitting/receiving system 100. At this point, the position of the unmanned aircraft 421 can be estimated with higher accuracy by applying the above-described signal transmitting/receiving system 100 in position estimation. Therefore, movement and the posture of the unmanned aircraft 421 can be controlled with higher accuracy.

Additionally, a system to which the present technology can be applied is not limited to the examples described above. The present technology can be applied to any system that involves measurement of a distance and a position, and can be applied to any system in various fields such as traffic, medical care, crime prevention, agriculture, beauty, factory, home appliance, and the like. Additionally, usage of the present technology is arbitrary as far as distance measurement and position measurement is applied. For example, the present technology can be utilized in various kinds of usage such as three-dimensional shape measurement, space measurement, object observation, observation on movement deformation, biometric observation, authentication processing, monitoring, auto-focusing, imaging control, illumination control, tracking processing, input/output control, electronic device control, and actuator control.

<Others>

The signal transmitting/receiving system 100 adapted to estimate a position of a transmitter 101 has been described above, but position estimation for the transmitter 101 may be omitted and only calculation of a distance between the transmitter 101 and a receiver 102 may be performed. In this case, at least one transmitter 101 and one receiver 102 are to be provided.

Additionally, it has been described above that each receiver 102 is fixedly installed, but a position of the receiver 102 may be any position as far as it is known and may also be variable. In other words, the receiver 102 may be movable.

Furthermore, a position of a transmitter is known and a position of a receiver is known like a signal transmitting/receiving system 430 illustrated in FIG. 21, and the position of the receiver may be obtained. For example, as illustrated in FIG. 21, transmitters 431-1 to 431-3 are fixedly installed respectively at known positions different from each other in the signal transmitting/receiving system 430. Furthermore, a receiver 432 is in a movable state such as a state being carried by a user, and a position thereof is unknown.

Then, each of the transmitters 431-1 to 431-3 perform grid transmission for a radio signal including information on itself and information on own position in a manner matched with a predetermined timing known to the receiving side. The receiver 432 receives the signals transmitted from each of the transmitters 431, obtains each propagation delay amounts, and calculates a distance to each of the transmitters 431. Furthermore, the receiver 432 transmits a signal by a three-point position measurement system or the like by using the calculated plurality of distances. In this case also, how to obtain the propagation delay amounts, distances, and position is basically similar to the case of the above-described signal transmitting/receiving system 100. Therefore, also in the case of the signal transmitting/receiving system 430, distance calculation, position estimation, and the like can also be performed with higher accuracy.

<Computer>

The above-described series of processing can be executed by hardware and also can be executed by software. In the case of executing the series of processing by software, a program constituting the software is installed in a computer. Here, the computer includes, for example, a computer incorporated in dedicated hardware, and a general-purpose personal computer or the like capable of executing various kinds of functions by installing various kinds of programs.

Figure 22:
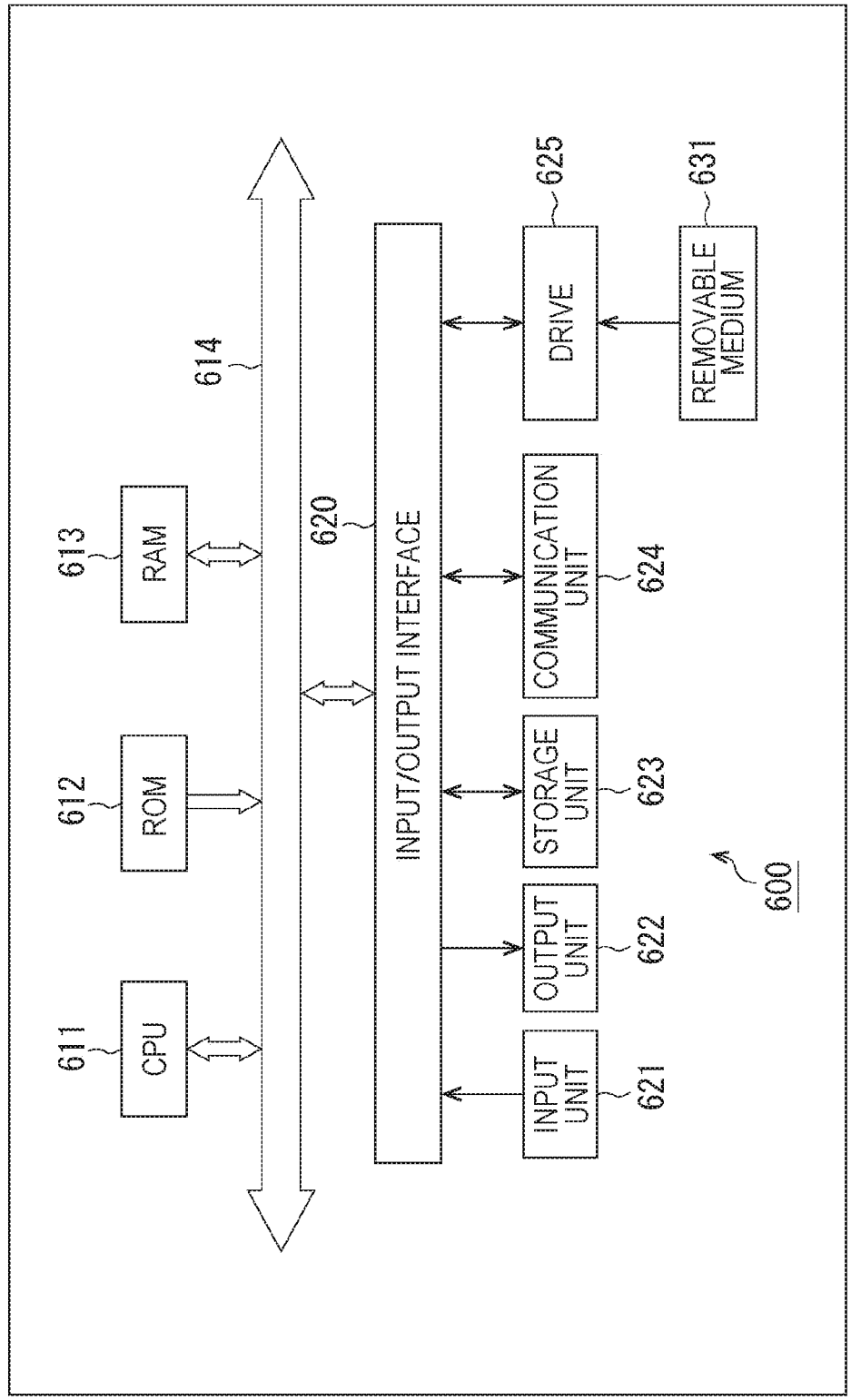

FIG. 22 is a block diagram illustrating an exemplary hardware configuration of the computer adapted to execute the above-described series of processing by a program.

A central processing unit (CPU) 611, a read only memory (ROM) 612, and a random access memory (RAM) 613 are mutually connected via a bus 614 in a computer 600 illustrated in FIG. 22.

An input/output interface 620 is also connected to the bus 614. An input unit 621, an output unit 622, a storage unit 623, a communication unit 624, and a drive 625 are connected to the input/output interface 620.

The input unit 621 includes, for example, a keyboard, a mouse, a microphone, a touch panel, an input terminal, and the like. The output unit 622 includes, for example, a display, a speaker, an output terminal, and the like. The storage unit 623 includes, for example, a hard disk, a RAM disk, a nonvolatile memory, and the like. The communication unit 624 includes, for example, a network interface. The drive 625 drives a removable medium 631 such as a magnetic disk, an optical disk, a magneto-optical disk, or a semiconductor memory.

In the computer having the above-described configuration, the above-described series of processing is performed by, for example, the CPU 611 loading, in the RAM 613, a program stored in the storage unit 623 via the input/output interface 620 and the bus 614, and executing the program. The RAM 613 also suitably stores data and the like necessary for the CPU 611 to execute various kinds of processing.

The program executed by the computer (CPU 611) can be applied by, for example, being recorded in the removable medium 631 as a package medium. In this case, the program can be installed in the storage unit 623 via the input/output interface 620 by attaching the removable medium 631 to the drive 625.

Also, the program can be provided via a wired or radio transmission medium such as a local area network, the Internet, or digital satellite broadcasting. In this case, the program can be received by the communication unit 624 and installed in the storage unit 623.

Besides, the program can be preliminarily installed in the ROM 612 or the storage unit 623.

Meanwhile, the program executed by a computer may be a program by which processing is performed in time series in accordance with the order described in the present specification or may be a program by which processing is performed in parallel or at a necessary timing such as when the program is called.

Furthermore, in the present specification, steps describing a program to be recorded in a recording medium include, of course, processing performed in a time-series manner in accordance with the described order and also include processing executed in parallel or individually although not executed in a time-series manner.

Additionally, the processing of each of the above-described steps can be executed by each of the above-described devices or by an arbitrary device other than the above-described devices. In this case, a device that executes the processing may include functions (function blocks and the like) necessary to execute the processing described above. Furthermore, information necessary for the processing may be suitably transmitted to the device.

Additionally, in the present specification, a system means an assembly of a plurality of constituent elements (devices, modules (parts), and the like), and whether all of the constituent elements are located in a same housing is disregarded. Therefore, both a plurality of devices housed in different housings and connected via a network and a device having a plurality of modules housed in a single housing are the systems.

Additionally, in the above description, the configuration described as one device (or processing unit) may be divided and may be formed as a plurality of devices (or processing units). In contrast, in the above description, the configuration described as a plurality of devices (or processing units) may be integrally configured as one device (or processing unit). Additionally, needless to mention, a configuration other than those described above may be added to the configuration of each device (or each processing unit).

Furthermore, as far as a configuration and operation of an entire system are substantially the same, a part of a configuration of a certain device (or processing unit) may be included in a configuration of another device (or another processing unit).

While the preferred embodiments of the present disclosure has been described in detail with reference to the attached drawings, the technical scope of the present disclosure is not limited to such examples. It is obvious that a person having ordinary skill in the technical field of the present disclosure can readily conceive a modified example or a revised example within the scope of the technical idea described in the claims, and it should be understood that these examples are also included in the technical scope of the present disclosure.

For example, the present technology can have a cloud computing configuration in which processing is performed in a collaborative manner while sharing one function among a plurality of devices via a network.

Furthermore, each of the steps described in the above-described flowcharts can be executed not only by one device but also by a plurality of devices in a sharing manner.

Moreover, in the case where a plurality of processing is included in one step, the plurality of processing included in this one step can be executed not only by one device but also by a plurality of devices in a sharing manner.

Additionally, the present technology is not limited thereto, and can be embodied as various configurations mounted on a device constituting the above-described device or system, for example, a processor as a system large scale integration (LSI) or the like, a module using a plurality of processors, a unit using a plurality of modules or the like, and a set achieved by adding another function to the unit (i.e., partial configuration of a device).

Further, the present technology may adopt the following configurations.

(1) A signal processing device including a transmission unit adapted to transmit a predetermined signal as a radio signal at a predetermined timing known to a receiving side.

(2) The signal processing device recited in (1), in which
the timing is a timing repeated at a predetermined time interval and capable of transmitting the signal, and
the transmission unit performs carrier sense to confirm whether communication is currently performed in a band in which the signal is to be transmitted, and in the case of confirming that the band is available, the signal is transmitted at the timing coming next.

(3) The signal processing device recited in (1) or (2), in which the transmission unit is adapted to grasp the timing on the basis of time information included in a global navigation satellite system (GNSS) signal, and transmit the signal.

(4) The signal processing device recited in any one of (1) to (3), in which the signal includes: information included in a global navigation satellite system (GNSS) signal or NULL data; and information on the signal processing device.

(5) The signal processing device recited in any one of (1) to (4), further including a generation unit adapted to generate the signal.

(6) A signal processing method including transmitting, by a signal processing device, a predetermined signal as a radio signal at a predetermined timing known to a receiving side.

(7) A program to cause a computer to function as a transmission unit adapted to transmit a predetermined signal as a radio signal at a predetermined timing known to a receiving side.

(8) An information processing device including a propagation delay amount calculation unit adapted to calculate a propagation delay amount of a predetermined signal on the basis of a correlation between the signal received as a radio signal and a reference signal synchronized with a transmission timing, the propagation delay amount being a delay amount from the transmission timing at which the signal is transmitted as the radio signal to a reception timing at which the signal is received.

(9) The information processing device recited in (8), in which
the transmission timing is any one of timings capable of transmitting the signal repeated at a predetermined time interval based on time information included in a global navigation satellite system (GNSS) signal, and
the propagation delay amount calculation unit is adapted to estimate which one of the timings capable of transmitting the signal is the transmission timing on the basis of the calculated propagation delay amount.

(10) The information processing device recited in (8) or (9), further including a transmission unit adapted to transmit the propagation delay amount calculated by the propagation delay amount calculation unit to another information processing device.

(11) The information processing device recited in any one of (8) to (10), further including a reception unit adapted to receive the signal,
in which the propagation delay amount calculation unit is adapted to calculate the propagation delay amount of the signal received by the reception unit.

(12) The information processing device recited in any one of (8) to (11), further including a distance calculation unit adapted to calculate a distance between a position where the signal is transmitted and a position where the signal is received on the basis of the propagation delay amount calculated by the propagation delay amount calculation unit device.

(13) The information processing device recited in (12), in which
the propagation delay amount calculation unit is adapted to calculate the propagation delay amount for each of a plurality of the signals transmitted from different positions and received at the same position,
the distance calculation unit is adapted to calculate, for each of the signals, a distance between a position where the signal is transmitted and a position where the signal is received on the basis of the propagation delay amount calculated by the propagation delay amount calculation unit, and
the information processing device further includes:
a positional information acquisition unit adapted to acquire, from each of the plurality of signals, positional information included in the signal and corresponding to information on a position where the signal is transmitted; and
a position estimation unit adapted to estimate, for each of the plurality of signals, a position where the signal is received on the basis of the distance calculated by the distance calculation unit and the positional information acquired by the positional information acquisition unit acquisition unit.

(14) An information processing method, including
calculating, by an information processing device, a propagation delay amount of a predetermined signal on the basis of a correlation between the signal received as a radio signal and a reference signal synchronized with a transmission timing, the propagation delay amount being a delay amount from the transmission timing at which the signal is transmitted as the radio signal to a reception timing at which the signal is received.

(15) A program to cause a computer to function as a propagation delay amount calculation unit adapted to calculate a propagation delay amount of a predetermined signal on the basis of a correlation between the signal received as a radio signal and a reference signal synchronized with a transmission timing, the propagation delay amount being a delay amount from the transmission timing at which the signal is transmitted as the radio signal to a reception timing at which the signal is received.

(16) An information processing device including a distance calculation unit adapted to calculate a distance between a position where a predetermined signal is transmitted and a position where the signal is received on the basis of a propagation delay amount that is a delay amount from a transmission timing at which the signal is transmitted as a radio signal to a reception timing at which the signal is received as the radio signal.

(17) The information processing device recited in (16), in which the distance calculation unit is adapted to calculate a distance between a position where the signal is transmitted and each of a plurality of positions where the signal is received, and the information processing device further includes a position estimation unit adapted to estimate, on the basis of the plurality of distances calculated by the distance calculation unit, a position where the signal is transmitted.

(18) The information processing device recited in (17), in which the distance calculation unit is adapted to calculate a distance between the position where the signal is transmitted and a position where the signal corresponding to each propagation delay amount is received, on the basis of a predetermined number of the propagation delay amounts which are selected from a plurality of the propagation delay amounts and have smaller values of the propagation delay amounts.

(19) An information processing method in which an information processing device calculates a distance between a position where a predetermined signal is transmitted and a position where the signal is received, on the basis of a propagation delay amount that is a delay amount from a transmission timing at which the signal is transmitted as a radio signal to a reception timing at which the signal is received as the radio signal.

(20) A program to cause a computer to function as a distance calculation unit adapted to calculate a distance between a position where a predetermined signal is transmitted and a position where the signal is received, on the basis of a propagation delay amount that is a delay amount from a transmission timing at which the signal is transmitted as a radio signal to a reception timing at which the signal is received as the radio signal.

REFERENCE SIGNS LIST

100 Signal transmitting/receiving system
101 Transmitter
102 Receiver
104 Server
131 Transmission signal generation unit
141 Transmission unit
151 GNSS signal reception unit
152 NULL generation unit
153 Selection unit
165 Grid transmission control unit
201 Reception unit
202 CPU
203 GNSS signal reception unit
204 Communication unit
255 Propagation delay amount calculation unit
260 Information acquisition unit
301 CPU
331 Propagation delay amount acquisition control unit
332 Storage control unit
333 Reading control unit
334 Selection unit
335 Distance calculation unit
336 Position estimation unit
337 Positional information output control unit
400 User position monitoring system
410 Anti-theft system
421 Unmanned aircraft
430 Signal transmitting/receiving system
600 Computer

The invention claimed is:

1. A signal processing device, comprising:
a generation unit configured to:
acquire transmission information based on a global navigation satellite system (GNSS) signal;
attach a first synchronization pattern to the acquired transmission information;
determine that the transmission information attached with the first synchronization pattern is read from a register for a determined number of times;
acquire the transmission information attached with a second synchronization pattern based on the determination, wherein the first synchronization pattern is different from the second synchronization pattern; and
generate a radio signal based on the transmission information attached with the second synchronization pattern; and
a transmission unit configured to
transmit the radio signal and the second synchronization pattern of the radio signal to a reception device at a first timing, wherein
the first timing and the second synchronization pattern of the radio signal are known to the reception device prior to the transmission of the radio signal, and
each of the first synchronization pattern and the second synchronization pattern of the radio signal includes a preamble of a frame format of the radio signal and a start-of-frame delimiter of the frame format of the radio signal.

2. The signal processing device according to claim 1, wherein the first timing corresponds to a timing repeated at specific time intervals, and the transmission unit is further configured to:
execute carrier sense;
determine, based on the execution of the carrier sense, availability of a band in which the radio signal is to be transmitted; and
transmit the radio signal at a second timing based on the availability of the band.

3. The signal processing device according to claim 1, wherein the transmission unit is further configured to:
acquire the first timing based on time information in the GNSS signal; and
transmit the radio signal based on the acquired first timing.

4. The signal processing device according to claim 1, wherein the radio signal includes information associated with at least one of the GNSS signal, NULL data, or the signal processing device.

5. A signal processing method, comprising:
in a signal processing device that comprises a generation unit and a transmission unit:
acquiring, by the generation unit, transmission information based on a global navigation satellite system (GNSS) signal;
attaching, by the generation unit, a first synchronization pattern to the acquired transmission information;
determining, by the generation unit, that the transmission information attached with the first synchronization pattern is read from a register for a determined number of times;
acquiring, by the generation unit, the transmission information attached with a second synchronization pattern based on the determination, wherein the first synchronization pattern is different from the second synchronization pattern;
generating, by the generation unit, a radio signal based on the transmission information attached with the second synchronization pattern; and
transmitting, by the transmission unit, the radio signal and the second synchronization pattern of the radio signal to a reception device at a specific timing, wherein
the specific timing and the second synchronization pattern of the radio signal are known to the reception device prior to the transmission of the radio signal, and
each of the first synchronization pattern and the second synchronization pattern of the radio signal includes a preamble of a frame format of the radio signal and a start-of-frame delimiter of the frame format of the radio signal.

6. A non-transitory computer-readable medium having stored thereon computer-executable instructions that, when executed by a signal processing device, cause the signal processing device to execute operations, the operations comprising:
acquiring transmission information based on a global navigation satellite system (GNSS) signal;
attaching a first synchronization pattern to the acquired transmission information;
determining that the transmission information attached with the first synchronization pattern is read from a register for a determined number of times;
acquiring the transmission information attached with a second synchronization pattern based on the determination, wherein the first synchronization pattern is different from the second synchronization pattern;
generating a radio signal based on the transmission information attached with the second synchronization pattern; and
transmitting the radio signal and the second synchronization pattern of the radio signal to a reception device at a specific timing, wherein
the specific timing and the second synchronization pattern of the radio signal are known to the reception device prior to the transmission of the radio signal, and
each of the first synchronization pattern and the second synchronization pattern of the radio signal includes a preamble of a frame format of the radio signal and a start-of-frame delimiter of the frame format of the radio signal.

7. A first information processing device, comprising:
a reception unit configured to receive, from a first transmission unit, a radio signal and a first synchronization pattern of the radio signal at a reception timing, wherein
the first synchronization pattern is attached to transmission information,
the transmission information is attached with the first synchronization pattern based on a determination that the transmission information attached with a second synchronization pattern is read from a register for a determined number of times,
the first synchronization pattern is different from the second synchronization pattern,
the first transmission unit transmits the radio signal and the first synchronization pattern of the radio signal at a transmission timing,
the transmission timing and the first synchronization pattern of the radio signal are known to the first information processing device prior to the transmission of the radio signal, and
each of the first synchronization pattern and the second synchronization pattern of the radio signal includes a preamble of a frame format of the radio signal and a start-of-frame delimiter of the frame format of the radio signal; and a propagation delay amount calculation unit configured to:
calculate a propagation delay amount of the radio signal based on a correlation between the reception timing of the radio signal and a reference signal synchronized with the transmission timing of the radio signal, wherein
the propagation delay amount is a delay amount from the transmission timing of the radio signal to the reception timing of the radio signal.

8. The first information processing device according to claim 7, wherein
the transmission timing corresponds to one of a plurality of timings at which the radio signal is transmittable,
the transmission timing is based on time information in a global navigation satellite system (GNSS) signal, and
the propagation delay amount calculation unit is further configured to determine the transmission timing from the plurality of timings based on the calculated propagation delay amount.

9. The first information processing device according to claim 7, further comprising a second transmission unit configured to transmit the propagation delay amount to a second information processing device.

10. The first information processing device according to claim 7, further comprising a distance calculation unit configured to calculate a first distance between a specific position of the first transmission unit and a first position of the first information processing device based on the propagation delay amount.

11. The first information processing device according to claim 10, wherein
the propagation delay amount calculation unit is further configured to calculate the propagation delay amount for each radio signal of a plurality of radio signals transmitted from a plurality of positions and received at a second position of the first information processing device, the distance calculation unit is further configured to calculate, for each radio signal of the plurality of radio signals, a second distance between each position of the plurality of positions and the second position, based on the propagation delay amount, and
the first information processing device further includes:
a positional information acquisition unit configured to acquire, from each radio signal of the plurality of radio signals, positional information of the each radio signal,
wherein the positional information of the each radio signal indicates a third position from where the each radio signal of the plurality of radio signals is transmitted; and
a position estimation unit configured to estimate, for the plurality of radio signals, the second position where the plurality of radio signals is received, wherein the estimation of the second position is based on the calculated second distance and the acquired positional information.

12. An information processing method, comprising:
in an information processing device that comprises a reception unit and a propagation delay amount calculation unit:
receiving, by the reception unit, a radio signal and a first synchronization pattern of the radio signal at a reception timing from a transmission unit, wherein
the first synchronization pattern is attached to transmission information,
the transmission information is attached with the first synchronization pattern based on a determination that the transmission information attached with a second synchronization pattern is read from a register for a determined number of times,
the first synchronization pattern is different from the second synchronization pattern,
the transmission unit transmits the radio signal and the first synchronization pattern of the radio signal at a transmission timing,
the transmission timing and the first synchronization pattern of the radio signal are known to the information processing device prior to the transmission of the radio signal, and
each of the first synchronization pattern and the second synchronization pattern of the radio signal includes a preamble of a frame format of the radio signal and a start-of-frame delimiter of the frame format of the radio signal; and
calculating, by the propagation delay amount calculation unit, a propagation delay amount of the radio signal based on a correlation between the reception timing of the radio signal and a reference signal synchronized with the transmission timing of the radio signal, wherein
the propagation delay amount is a delay amount from the transmission timing of the radio signal to the reception timing of the radio signal.

13. A non-transitory computer-readable medium having stored thereon computer-executable instructions that, when executed by an information processing device, cause the information processing device to execute operations, the operations comprising:
receiving a radio signal and a first synchronization pattern of the radio signal at a reception timing from a transmission unit, wherein
the first synchronization pattern is attached to transmission information,
the transmission information is attached with the first synchronization pattern based on a determination that the transmission information attached with a second synchronization pattern is read from a register for a determined number of times,
the first synchronization pattern is different from the second synchronization pattern,
the transmission unit transmits the radio signal and the first synchronization pattern of the radio signal at a transmission timing,
the transmission timing and the first synchronization pattern of the radio signal are known to the information processing device prior to the transmission of the radio signal, and
each of the first synchronization pattern and the second synchronization pattern of the radio signal includes a preamble of a frame format of the radio signal and a start-of-frame delimiter of the frame format of the radio signal; and
calculating a propagation delay amount of the radio signal based on a correlation between the reception timing of the radio signal and a reference signal synchronized with the transmission timing of the radio signal, wherein
the propagation delay amount is a delay amount from the transmission timing of the radio signal to the reception timing of the radio signal.

14. An information processing device, comprising:
a distance calculation unit configured to calculate a first distance between a first position of a transmission unit and a second position of a reception unit, based on a propagation delay amount, wherein
the transmission unit transmits a radio signal and a first synchronization pattern of the radio signal to the reception unit at a transmission timing,
the first synchronization pattern is attached to transmission information,
the transmission information is attached with the first synchronization pattern based on a determination that the transmission information attached with a second synchronization pattern is read from a register for a determined number of times,
the first synchronization pattern is different from the second synchronization pattern,
the transmission timing and the first synchronization pattern of the radio signal are known to the reception unit prior to the transmission of the radio signal,
each of the first synchronization pattern and the second synchronization pattern of the radio signal includes a preamble of a frame format of the radio signal and a start-of-frame delimiter of the frame format of the radio signal, and
the propagation delay amount is a delay amount from the transmission timing of the radio signal to a reception timing at which the radio signal is received by the reception unit.

15. The information processing device according to claim 14, wherein
the distance calculation unit is further configured to calculate a second distance between the first position of the transmission unit and each position of a plurality of positions where the radio signal is received, and
the information processing device further includes a position estimation unit configured to estimate, based on the second distance, a third position of the transmission unit.

16. The information processing device according to claim 14, wherein
the distance calculation unit is further configured to calculate a third distance between the first position and a fourth position where the radio signal corresponding to each propagation delay amount of a plurality of propagation delay amounts is received, wherein
the calculation of the third distance is based on a number of propagation delay amounts selected from the plurality of propagation delay amounts, and
the number of propagation delay amounts has values smaller than values of remaining propagation delay amounts of the plurality of propagation delay amounts.

17. An information processing method, comprising:
calculating, by an information processing device, a distance between a position of a transmission unit and a position of a reception unit, based on a propagation delay amount, wherein
the transmission unit transmits a radio signal and a first synchronization pattern of the radio signal to the reception unit at a transmission timing,
the first synchronization pattern is attached to transmission information,
the transmission information is attached with the first synchronization pattern based on a determination that the transmission information attached with a second synchronization pattern is read from a register for a determined number of times,
the first synchronization pattern is different from the second synchronization pattern,
the transmission timing and the first synchronization pattern of the radio signal are known to the reception unit prior to the transmission of the radio signal,
each of the first synchronization pattern and the second synchronization pattern of the radio signal includes a preamble of a frame format of the radio signal and a start-of-frame delimiter of the frame format of the radio signal, and
the propagation delay amount is a delay amount from the transmission timing of the radio signal to a reception timing at which the radio signal is received by the reception unit.

18. A non-transitory computer-readable medium having stored thereon computer-executable instructions that, when executed by an information processing device, cause the information processing device to execute operations, the operations comprising:
calculating a distance between a position of a transmission unit and a position of a reception unit, based on a propagation delay amount, wherein
the transmission unit transmits a radio signal and a first synchronization pattern of the radio signal to the reception unit at a transmission timing,
the first synchronization pattern is attached to transmission information,
the transmission information is attached with the first synchronization pattern based on a determination that the transmission information attached with a second synchronization pattern is read from a register for a determined number of times,
the first synchronization pattern is different from the second synchronization pattern,
the transmission timing and the first synchronization pattern of the radio signal are known to the reception unit prior to the transmission of the radio signal,
each of the first synchronization pattern and the second synchronization pattern of the radio signal includes a preamble of a frame format of the radio signal and a start-of-frame delimiter of the frame format of the radio signal, and
the propagation delay amount is a delay amount from the transmission timing of the radio signal to a reception timing at which the radio signal is received by the reception unit.

* * * * *